United States Patent
Sashihara

(10) Patent No.: US 9,826,421 B2
(45) Date of Patent: Nov. 21, 2017

(54) WIRELESS BASE STATION, COMMUNICATION SYSTEM, WIRELESS-PARAMETER OPTIMIZATION METHOD, AND STORAGE MEDIUM

(71) Applicant: NEC Corporation, Minato-ku, Tokyo (JP)

(72) Inventor: Toshiyuki Sashihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/306,627

(22) PCT Filed: May 11, 2015

(86) PCT No.: PCT/JP2015/002372
§ 371 (c)(1),
(2) Date: Oct. 25, 2016

(87) PCT Pub. No.: WO2015/174066
PCT Pub. Date: Nov. 19, 2015

(65) Prior Publication Data
US 2017/0048730 A1    Feb. 16, 2017

(30) Foreign Application Priority Data
May 12, 2014    (JP) .................. 2014-098365

(51) Int. Cl.
*H04W 4/00*    (2009.01)
*H04W 24/02*    (2009.01)
(Continued)

(52) U.S. Cl.
CPC ........... *H04W 24/02* (2013.01); *H04W 16/32* (2013.01); *H04W 28/18* (2013.01); *H04W 64/003* (2013.01); *H04W 84/042* (2013.01)

(58) Field of Classification Search
CPC ....... H04W 24/02; H04W 4/02; H04W 4/023; H04W 28/18; H04W 84/12; H04W 24/08
See application file for complete search history.

(56) References Cited

U.S. PATENT DOCUMENTS 8,725,154 B2 * 5/2014 Sugahara ............ H04W 36/245
                                                                   455/436
8,879,441 B2    11/2014 Hunukumbure et al.
(Continued)

FOREIGN PATENT DOCUMENTS

JP    2012-253763 A    12/2012
WO    2010/104143 A1    9/2010
(Continued)

OTHER PUBLICATIONS

International Search Report for PCT Application No. PCT/JP2015/002372, dated Aug. 4, 2015.
(Continued)

*Primary Examiner* — Khalid Shaheed

(57) ABSTRACT

In order to set optimal wireless parameters, a wireless base station includes: a wireless parameter control unit (402) configured to determine whether it is necessary to perform wireless parameter optimization in an own wireless base station; and a determination unit (404) configured to determine whether another wireless base station performs wireless parameter optimization in the another wireless base station when the wireless parameter control unit determines that it is necessary to perform the wireless parameter optimization. The wireless parameter control unit (402) performs wireless parameter optimization in the own wireless base station when the determination unit determines that the another wireless base station does not perform wireless parameter optimization in the another wireless base station. The wireless parameter control unit cancels to perform wireless parameter optimization in the own wireless base
(Continued)

station when the determination unit determines that the another wireless base station performs wireless parameter optimization in the another wireless base station.

12 Claims, 21 Drawing Sheets

(51) Int. Cl.
*H04W 16/32* (2009.01)
*H04W 28/18* (2009.01)
*H04W 64/00* (2009.01)
*H04W 84/04* (2009.01)

(56) References Cited

U.S. PATENT DOCUMENTS

2012/0115541 A1* 5/2012 Suga ............... H04W 36/22
 455/525
2012/0307750 A1 12/2012 Hunukumbure et al.
2013/0090122 A1* 4/2013 Karla ............... H04W 28/18
 455/450
2015/0044974 A1 2/2015 Futaki et al.

FOREIGN PATENT DOCUMENTS

WO 2012/081150 A1 6/2012
WO 2013/136812 A1 9/2013

OTHER PUBLICATIONS

English translation of Written opinion for PCT Application No. PCT/JP2015/002372.

* cited by examiner

1: OPTIMIZATION START
2: OPTIMIZATION END (= OPTIMIZATION PROCESSING IN PROGRESS)

1: OPTIMIZATION START
2: OPTIMIZATION END

1: OPTIMIZATION START
2: OPTIMIZATION END

WIRELESS BASE STATION, COMMUNICATION SYSTEM, WIRELESS-PARAMETER OPTIMIZATION METHOD, AND STORAGE MEDIUM

This application is a National Stage Entry of PCT/JP2015/002372 filed on May 11, 2015, which claims priority from Japanese Patent Application 2014-098365 filed on May 12, 2014, the contents of all of which are incorporated herein by reference, in their entirety.

TECHNICAL FIELD

The present disclosure relates to a wireless base station that executes optimization processing of wireless parameters, a communication system, a wireless-parameter optimization method, and a storage medium.

BACKGROUND ART

In a mobile phone network such as LTE (Long Term Evolution) and the like, in order to reduce an operation cost of the network, there is used an SON (Self Organizing Network) technique for autonomously optimizing various types of wireless-parameters. In this technique, in general, the need for optimizing the network is determined by using measurement results in a UE (User Equipment) that is a communication terminal and an eNB (evolved Node B) that is a wireless base station and information of a peripheral eNB acquired via an X2 interface. When it is determined that the optimization is necessary, an optimum wireless-parameter value for the network is determined using the aforementioned information, and the wireless parameter value is changed to a determined value.

In the method disclosed in PTL 1, for example, an optimum transmission power of a pico BS (Base Station) is determined by using an RSRP (Reference Signal Received Power) value measured in a pico UE, and a transmission power of a pico eNB is changed. At that time, even when another pico eNB exists in a neighborhood, the transmission power of the pico eNB is optimized without considering a state of optimization execution of the pico eNB existing in the neighborhood.

Further, PTL 2, for example, discloses a system in which state control information in a wireless base station is reported to an adjacent wireless base station via a control station, and wireless parameters are efficiently set to appropriate values.

CITATION LIST

Patent Literature

PTL 1: International Publication No. WO2012/081150
PTL 2: International Publication No. WO2010/104143

SUMMARY OF INVENTION

Technical Problem

When an optimization function using an optimization method as described in PTL 1 operates in a plurality of eNBs at the same time, optimized wireless parameters may not be the expected results. Specifically, such a case includes the case where an eNB that is scheduled to be optimized exists in a neighborhood of an eNB to which a certain optimization is performed. Hereinafter, description will be made more specifically using drawings.

FIG. 20 is a diagram illustrating one form of a common communication system.

As illustrated in FIG. 20, within a macro cell 61 that is a coverage of a macro eNB 2 that is a wireless base station connected to a core network 1, there are a macro UE 3 that is a communication terminal and pico eNBs 4100-1 and 4100-2 that are wireless base stations. Further, a pico cell 6200-1 that is a coverage of the pico eNB 4100-1 and a pico cell 6200-2 that is a coverage of the pico eNB 4100-2 are adjacent to each other. Further, the pico eNB 4100 and the pico eNB 4200 each incorporate a wireless-parameter control device that controls wireless parameters. Further, the pico eNBs 4100-1 and 4100-2 are each connected to the core network 1.

In such a form, in the pico eNBs 4100-1 and 4100-2, in order to adjust wireless parameters so that a place where a number of communication terminals is small becomes a cell edge, it is likely that simultaneous collection of measurement reports of wireless quality from pico UEs 51-1 to 51-3 that are communication terminals may occur. At that time, the pico eNB 4100-1 has not recognized that the pico eNB 4100-2 tries to change wireless parameters. Therefore, the pico eNB 4100-1 adjusts wireless parameters of the pico eNB 4100-1 so that a place where a number of communication terminals is small becomes a cell edge, assuming that the pico eNB 4100-2 does not change wireless parameters. On the other hand, in the same manner, the pico eNB 4100-2 also adjusts wireless parameters of the pico eNB 4100-2 so that a place where a number of communication terminals is small becomes a cell edge, assuming that the pico eNB 4100-1 does not change wireless parameters.

FIG. 21 is a diagram illustrating one example of a state of changes of the pico cells 6200-1 and 6200-2 after the pico eNBs 4100-1 and 4100-2 illustrated in FIG. 20 change wireless parameters at the same time.

As illustrated in FIG. 21, a result of the pico eNBs 4100-1 and 4100-2 changing the wireless parameters at the same time, pico cells illustrated with a dashed line change to the pico cells 6200-1 and 6200-2 illustrated with a solid line. Thereby, the pico UE 51-3 may go out of the pico cells 6200-1 and 6200-2 that are coverages of the pico eNBs 4100-1 and 4100-2, respectively.

In this manner, when optimization is performed individually in each pico eNB, it is difficult to recognize a performance state of wireless-parameter optimization in a neighboring pico eNB. Therefore, each pico eNB determines optimum wireless parameters, assuming that a neighboring pico eNB maintains a state of wireless-parameters, and applies the determined optimum wireless parameters. When the neighboring pico eNB has changed the wireless parameters at the stage of applying the optimum wireless parameters, the precondition that the above-described optimum wireless parameters are optimum may collapse. As a result, there occurs a problem that it is possible to lapse into even more inappropriate state.

Further, also in a system as described in PTL 2, it is difficult to recognize a performance state of wireless-parameter optimization in a neighboring wireless base station, and therefore the same problem arises.

An object of an exemplary embodiment is to provide a wireless base station, a communication system, a wireless-parameter optimization method, and a storage medium that solve the above-described problems.

Solution to Problem

A wireless base station of an exemplary embodiment includes:

a wireless-parameter control unit that determines whether it is necessary to perform wireless-parameter optimization in an own wireless base station; and a determination unit that determines whether another wireless base station is performing wireless-parameter optimization in the another wireless base station when the wireless-parameter control unit determines that it is necessary to perform the wireless-parameter optimization, the wireless-parameter control unit performing wireless-parameter optimization in the own wireless base station when the determination unit determines that the another wireless base station is not performing wireless-parameter optimization in the another wireless base station, and cancelling to perform wireless-parameter optimization in the own wireless base station when the determination unit determines that the another wireless base station is performing wireless-parameter optimization in the another wireless base station.

Further, a communication system of another exemplary embodiment is a communication system including a plurality of wireless base stations, the system including:

a wireless-parameter control unit that determines whether it is necessary to perform wireless-parameter optimization in the wireless base stations; and a determination unit that determines, when the wireless-parameter control unit determines that it is necessary to perform the wireless-parameter optimization, whether wireless-parameter optimization is being performed in a wireless base station other than a wireless base station determined to be necessary to perform the wireless-parameter optimization among the plurality of wireless base stations, the wireless-parameter control unit performing wireless-parameter optimization in the wireless base station determined to be necessary to perform the wireless-parameter optimization when the determination unit determines that wireless-parameter optimization is not being performed in the wireless base station other than the wireless base station determined to be necessary to perform the wireless-parameter optimization among the plurality of wireless base stations, and cancelling to perform wireless-parameter optimization in the wireless base station determined to be necessary to perform the wireless-parameter optimization when the determination unit determines that wireless-parameter optimization is being performed in the wireless base station other than the wireless base station determined to be necessary to perform the wireless-parameter optimization among the plurality of wireless base stations.

Further, a wireless-parameter optimization method of another exemplary embodiment executes:

processing for determining whether it is necessary to perform wireless-parameter optimization in a wireless base station;

processing for determining, when it is determined that it is necessary to perform the wireless-parameter optimization, whether wireless-parameter optimization is being performed in a wireless base station other than a wireless base station determined to be necessary to perform the wireless-parameter optimization among a plurality of wireless base stations configuring a communication system;

processing for performing wireless-parameter optimization in the wireless base station determined to be necessary to perform the wireless-parameter optimization when it is determined that wireless-parameter optimization is not being performed in the wireless base station other than the wireless base station determined to be necessary to perform the wireless-parameter optimization among the plurality of wireless base stations; and processing for cancelling to perform wireless-parameter optimization in the wireless base station determined to be necessary to perform the wireless-parameter optimization when it is determined that wireless-parameter optimization is being performed in the wireless base station other than the wireless base station determined to be necessary to perform the wireless-parameter optimization among the plurality of wireless base stations.

Further, a storage medium of another exemplary embodiment is a storage medium storing a program for causing a computer to execute:

the step of determining whether it is necessary to perform wireless-parameter optimization in a wireless base station;

the step of determining, when it is determined that it is necessary to perform the wireless-parameter optimization, whether wireless-parameter optimization is being performed in a wireless base station other than a wireless base station determined to be necessary to perform the wireless-parameter optimization among a plurality of wireless base stations configuring a communication system;

the step of performing wireless-parameter optimization in the wireless base station determined to be necessary to perform the wireless-parameter optimization when it is determined that wireless-parameter optimization is not being performed in the wireless base station other than the wireless base station determined to be necessary to perform the wireless-parameter optimization among the plurality of wireless base stations; and the step of cancelling to perform wireless-parameter optimization in the wireless base station determined to be necessary to perform the wireless-parameter optimization when it is determined that wireless-parameter optimization is being performed in the wireless base station other than the wireless base station determined to be necessary to perform the wireless-parameter optimization among the plurality of wireless base stations.

Advantageous Effects of Invention

As described above, in the exemplary embodiment, optimum wireless parameters can be set.

DESCRIPTION OF EMBODIMENTS

Hereinafter, the exemplary embodiment will be described with reference to the drawings.
(First Exemplary Embodiment)

Figure 1:
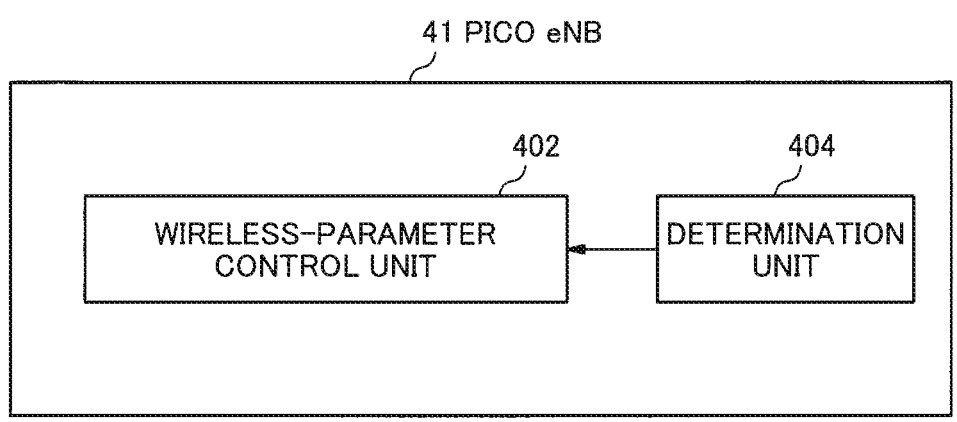
FIG. 1 is a diagram illustrating a first embodiment of a wireless base station of an exemplary embodiment.

FIG. 1 is a diagram illustrating a first embodiment of the wireless base station of the exemplary embodiment.

As illustrated in FIG. 1, the wireless base station (pico eNB 41) in the present embodiment consists of a wireless-parameter control unit 402 and a determination unit 404. In FIG. 1, from among components included in the wireless base station (pico eNB 41) in the present embodiment, one example of main components according to the present exemplary embodiment is illustrated.

The wireless-parameter control unit 402 determines whether it is necessary to perform wireless-parameter optimization in the pico eNB 41 serving as its own wireless base station. This determination method may be a method as disclosed in above-described PTL 1, for example. Further, the wireless-parameter control unit 402 performs wireless-parameter optimization in the pico eNB 41 when the determination unit 404 determines that a pico eNB serving as another wireless base station is not performing wireless-parameter optimization in the pico eNB. The method for this wireless-parameter optimization processing may be a method as disclosed in above-described PTL 1, for example. Further, the wireless-parameter control unit 402 cancels performing wireless-parameter optimization in the pico eNB 41 when the determination unit 404 determines that the pico eNB serving as another wireless base station is performing wireless-parameter optimization in the pico eNB.

When the wireless-parameter control unit 402 determines that it is necessary to perform wireless-parameter optimization, the determination unit 404 determines whether a pico eNB serving as another wireless base station is performing wireless-parameter optimization in the pico eNB. This determination method will be described later.

Hereinafter, a wireless-parameter optimization method in the pico eNB 41 illustrated in FIG. 1 will be described.

Figure 2:
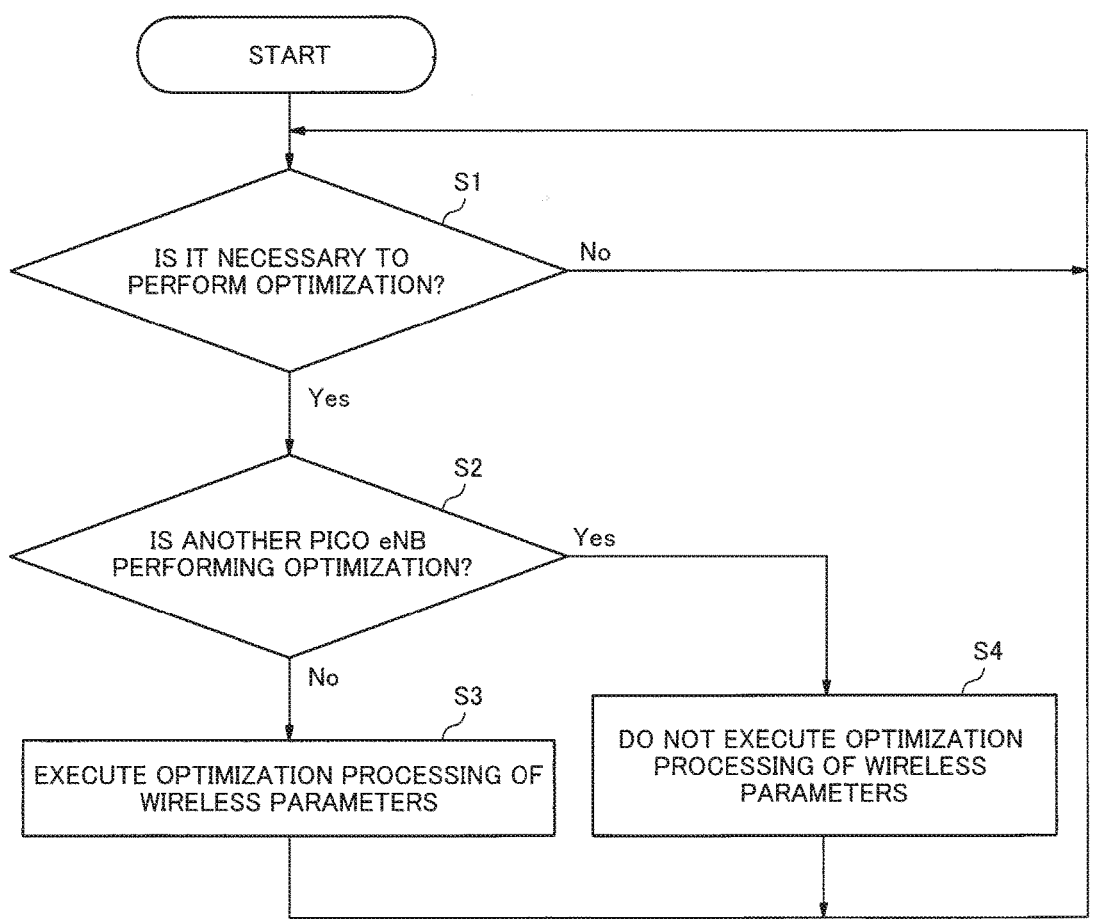
FIG. 2 is a flowchart for illustrating one example of a wireless-parameter optimization method in a pico eNB illustrated in FIG. 1.

FIG. 2 is a flowchart for illustrating one example of the wireless-parameter optimization method in the pico eNB 41 illustrated in FIG. 1.

First, the wireless-parameter control unit 402 determines whether it is necessary to perform wireless-parameter optimization in the pico eNB 41 (step S1). When the wireless-parameter control unit 402 determines that it is necessary to perform wireless-parameter optimization, the determination unit 404 determines whether a pico eNB serving as another wireless base station is performing wireless-parameter optimization in the pico eNB (step S2).

When the determination unit 404 determines that the pico eNB serving as another wireless base station is not performing wireless-parameter optimization in the pico eNB, the wireless-parameter control unit 402 performs optimization processing of wireless parameters in the pico eNB 41 (step S3). On the other hand, when the determination unit 404 determines that the pico eNB serving as another wireless base station is performing wireless-parameter optimization in the pico eNB in step S2, the wireless-parameter control unit 402 cancels performing optimization processing of wireless parameters in the pico eNB 41 (step S4). In other words, in this case, the wireless-parameter control unit 402 does not perform optimization processing of wireless parameters in the pico eNB 41.

In this manner, upon performing optimization processing of wireless parameters, execution of optimization processing in an own wireless base station is cancelled when another wireless base station is performing optimization processing. Thereby, it is possible to avoid a fault of wireless parameters caused by optimization processing performed by one wireless base station while the other wireless base station performs optimization processing.
(Second Exemplary Embodiment)

Figure 3:
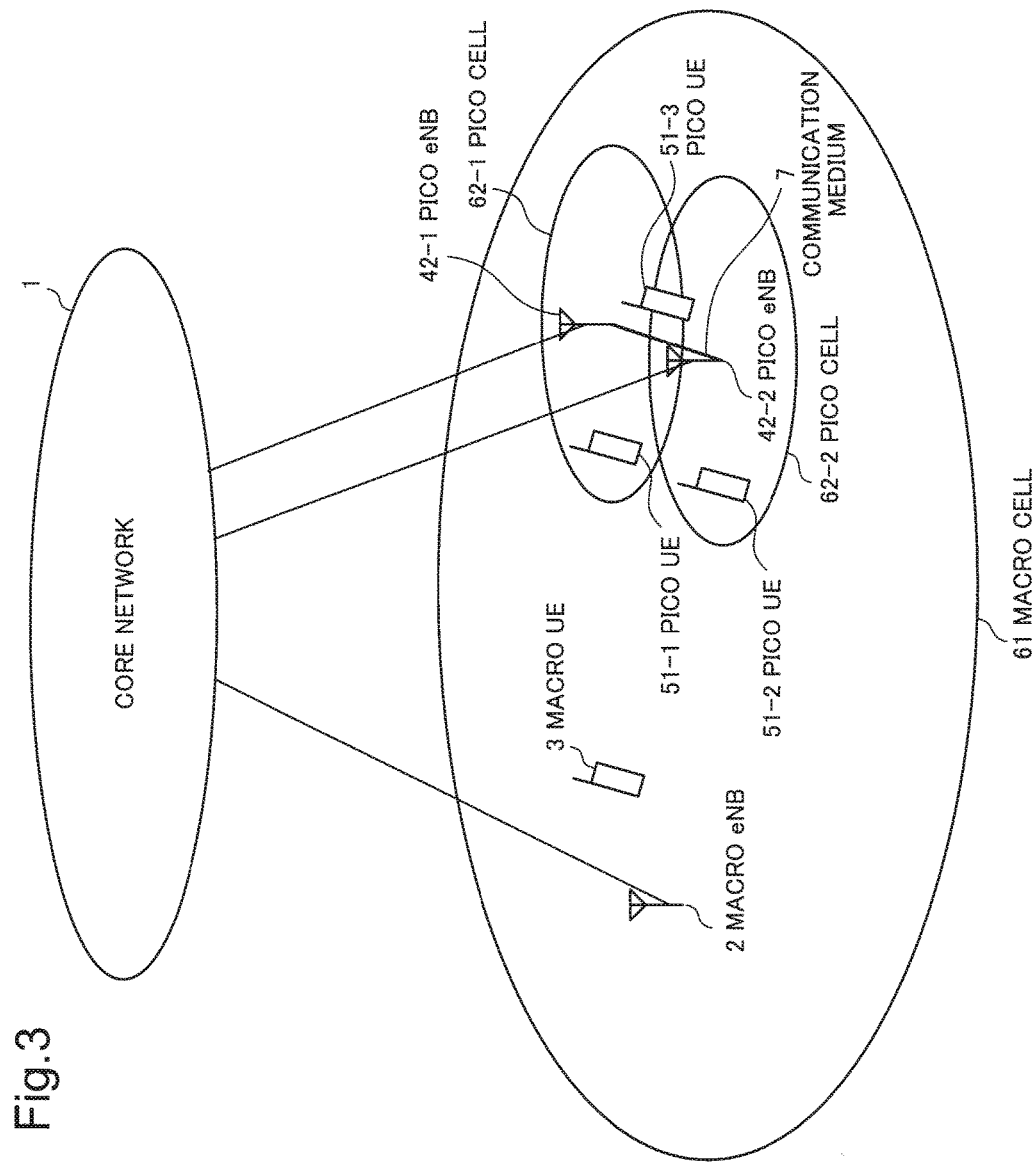
FIG. 3 is a diagram illustrating a second embodiment of the wireless base station of the exemplary embodiment.

FIG. 3 is a diagram illustrating a second embodiment of the wireless base station of the exemplary embodiment.

As illustrated in FIG. 3, the present embodiment is a communication system in which a macro eNB 2 and pico eNBs 42-1 and 42-2 are connected to a core network 1. In the following description, it is assumed that "another wireless base station" of the pico eNB 42-1 illustrated in FIG. 3 is the pico eNB 42-2, however, when there is a wireless base station other than the pico eNB 42-2, it goes without saying that the wireless base station is also "another wireless base station".

The core network 1 is a higher-level network of the macro eNB 2 and the pico eNBs 42-1 and 42-2. The macro eNB 2 is a wireless base station in which a macro cell 61 is formed as a coverage. The pico eNB 42-1 is a wireless base station in which a pico cell 62-1 is formed as a coverage. The pico eNB 42-2 is a wireless base station in which a pico cell 62-2 is formed as a coverage. There is a macro UE 3 that is a communication terminal in a range of the macro cell 61. There is a pico UE 51-1 that is a communication terminal in a range of the pico cell 62-1. There is a pico UE 51-2 that is a communication terminal in a range of the pico cell 62-2. Further, there is a pico UE 51-3 that is a communication terminal in an overlapping range of the pico cell 62-1 and the pico cell 62-2. The macro eNB 2 and the pico eNBs 42-1 and 42-2 that are respective wireless base stations each relay traffic between a communication terminal existing in the own coverage and the core network 1. Further, the pico eNB 42-1 and the pico eNB 42-2 are connected via a communication medium 7. In the communication medium 7, for example, an X2 link may be established.

Figure 4:
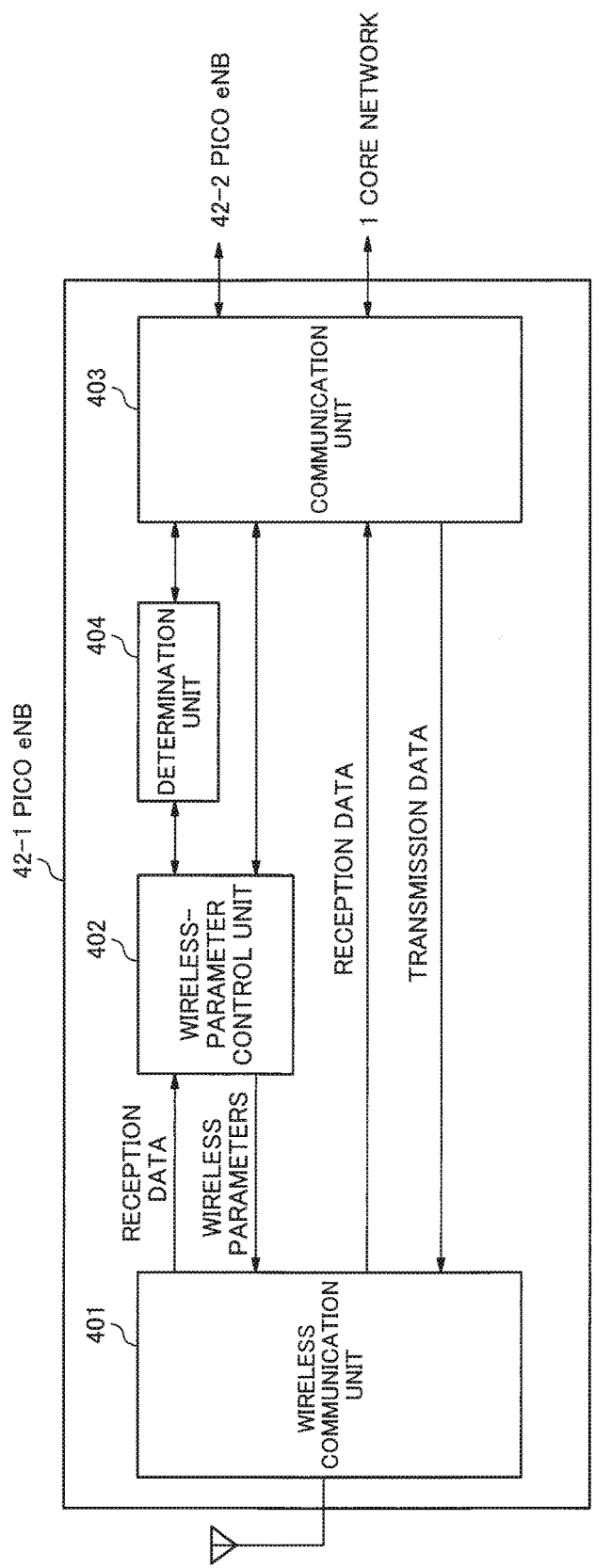
FIG. 4 is a diagram illustrating one example of an internal configuration of a pico eNB illustrated in FIG. 3.

FIG. 4 is a diagram illustrating one example of an internal configuration of the pico eNB 42-1 illustrated in FIG. 3.

The pico eNB 42-1 illustrated in FIG. 3 includes, as illustrated in FIG. 4, a wireless communication unit 401, a wireless-parameter control unit 402, a communication unit 403, and a determination unit 404. Note that in FIG. 4, from among components included in the pico eNB 42-1 illustrated in FIG. 3, one example of main components according to the present exemplary embodiment is illustrated. Further, an internal configuration of the pico eNB 42-2 illustrated in FIG. 3 may be the same as the internal configuration illustrated in FIG. 4.

The wireless communication unit 401 performs wireless communication with communication terminals (the pico UEs 51-1 and 51-3 in the embodiment illustrated in FIG. 3) existing within the pico cell 62-1. The wireless communication unit 401 transmits downlink wireless signals in which control data and user data are encoded to the pico UEs 51-1 and 51-3. Further, the wireless communication unit 401 receives uplink wireless signals transmitted from the pico UEs 51-1 and 51-3 and decodes reception data from the received uplink wireless signals. The wireless communication unit 401 outputs, to the wireless-parameter control unit 402, measurement data necessary for determining whether it is necessary to perform optimization processing of wireless parameters, from among the decoded reception data. The wireless communication unit 401 outputs the user data from among the decoded reception data, to the communication unit 403.

The wireless-parameter control unit 402 determines whether it is necessary to perform optimization processing of wireless parameters in the pico eNB 42-1. Specifically, the wireless-parameter control unit 402 determines whether it is necessary to perform optimization processing of wireless parameters using the measurement data output from the wireless communication unit 401. The wireless-parameter control unit 402 reports, when determining that it is necessary to perform optimization processing of wireless parameters, the necessity to the determination unit 404. The wireless-parameter control unit 402 performs wireless-parameter optimization in the pico eNB 42-1 when the result reported from the determination unit 404 indicates that the pico eNB 42-2 serving as another wireless communication base station is not performing wireless-parameter optimization in the pico eNB 42-2. On the other hand, the wireless-parameter control unit 402 cancels performing wireless-parameter optimization in the pico eNB 42-1 when the result reported from the determination unit 404 indicates that the pico eNB 42-2 is performing wireless-parameter optimization in the pico eNB 42-2. In the optimization processing of wireless parameters performed by the wireless-parameter control unit 402, a common method as disclosed in PTL 1 is used to calculate optimum wireless parameters. The wireless-parameter control unit 402 then controls the wireless communication unit 401 using the calculated result.

The determination unit 404 determines whether the pico eNB 42-2 is performing wireless-parameter optimization in the pico eNB 42-2, when the wireless-parameter control unit 402 reports that optimization processing of wireless parameters is necessary. This determination method will be described by citing the following two specific examples.

First, a first example will be described. The determination unit 404 determines that the pico eNB 42-2 is performing wireless-parameter optimization in the pico eNB 42-2 during a period from transmission of a start message from the pico eNB 42-2 to transmission of a termination message therefrom. This start message is a message indicating that the pico eNB 42-2 starts wireless-parameter optimization in the pico eNB 42-2. Further, this termination message is a message indicating that the pico eNB 42-2 has terminated the wireless-parameter optimization being performed in the pico eNB 42-2.

Next, a second example will be described. The determination unit 404 determines that the pico eNB 42-2 is performing wireless-parameter optimization in the pico eNB 42-2 when the pico eNB 42-2 is transmitting an optimization-in-progress message at a predetermined cycle. This optimization-in-progress message is a message indicating that the pico eNB 42-2 is performing wireless-parameter optimization in the pico eNB 42-2.

Further, the determination unit 404 reports the determination result to the wireless-parameter control unit 402.

The communication unit 403 receives a message transmitted from the pico eNB 42-2 and transmits a predetermined message to the pico eNB 42-2. In a system using the above-described first example as the determination method in the determination unit 404, the communication unit 403 transmits, when the wireless-parameter control unit 402 starts wireless-parameter optimization, a start message indicating the start of the optimization and transmits, when the optimization is terminated, a termination message indicating the termination of the optimization. Further, in a system using the above-described second example as the determination method in the determination unit 404, the communication unit 403 transmits, when the wireless-parameter control unit 402 is performing wireless-parameter optimization, an optimization-in-progress message indicating that the optimization is being performed, at a predetermined cycle. Further, the communication unit 403 performs transmission/reception of information to and from a higher-level network such as the core network 1. Further, the communication unit 403 supports an inter-base station interface (an X2 interface of LTE or the like) and performs transmission/reception of information to and from another wireless base station such as the pico eNB 42-2.

It is possible that the pico eNB 42-1 does not include the determination unit 404 and the wireless-parameter control unit 402 additionally executes the above-described processing of the determination unit 404.

Hereinafter, a wireless-parameter optimization method in the embodiment illustrated in FIG. 3 will be described.

Figure 5:
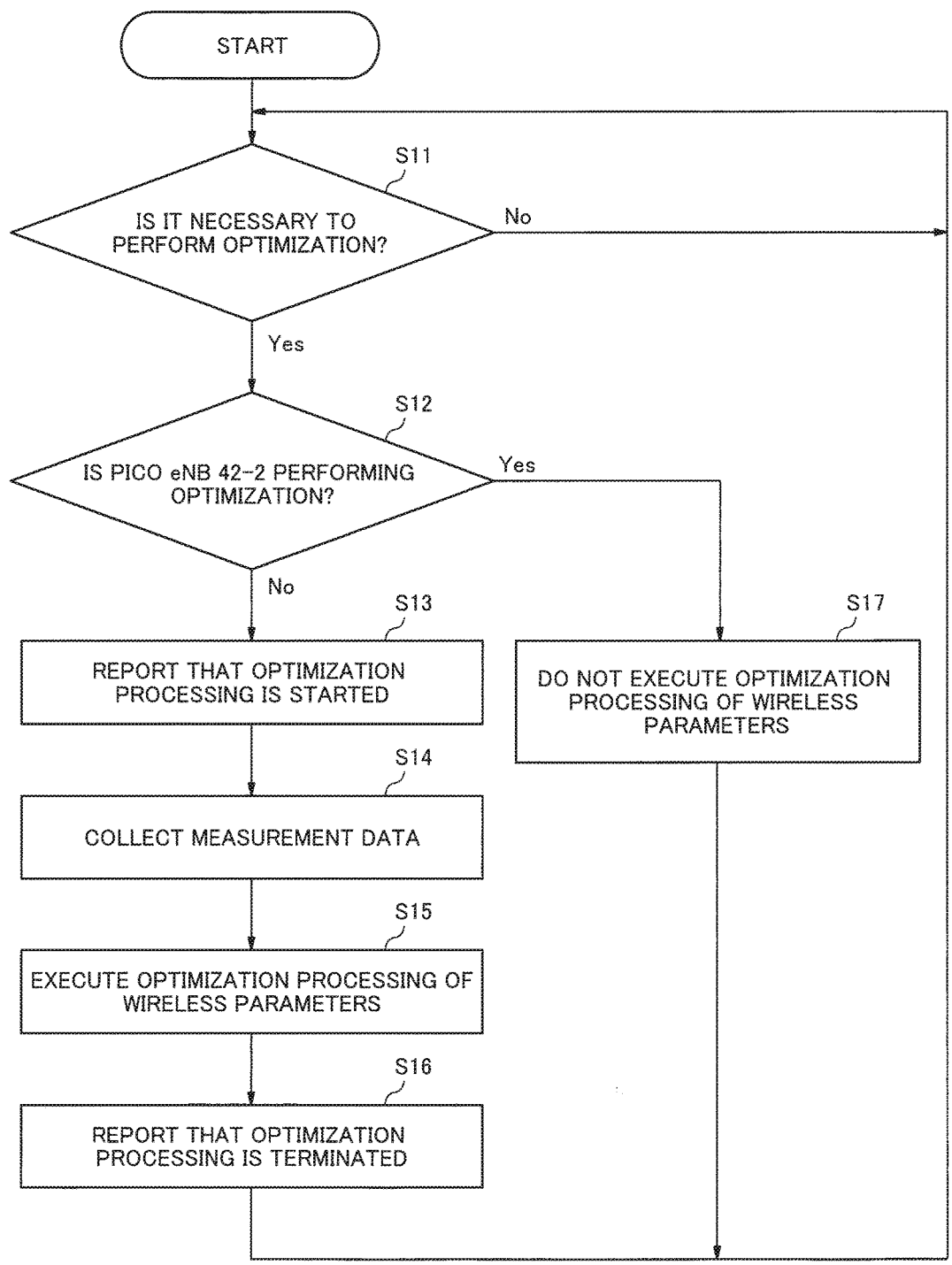
FIG. 5 is a flowchart for illustrating a first example of a wireless-parameter optimization method in the embodiment illustrated in FIG. 3.

FIG. 5 is a flowchart for illustrating a first example of the wireless-parameter optimization method in the embodiment illustrated in FIG. 3.

First, the wireless-parameter control unit 402 aggregates measurement data measured by the wireless communication unit 401 and determines, on the basis of the aggregated result, whether it is necessary to perform wireless-parameter optimization in the pico eNB 42-1 (step S11). The aggregation of measurement data may be performed using a method of performing aggregation at every certain cycle. When the wireless-parameter control unit 402 determines that it is necessary to perform wireless-parameter optimization, the determination unit 404 determines whether the pico eNB 42-2 serving as another wireless base station is performing wireless-parameter optimization in the pico eNB 42-2 (step S12). At that time, during a period from transmission of a start message from the pico eNB 42-2 to transmission of a termination message therefrom, the determination unit 404 determines that the pico eNB 42-2 is performing wireless-parameter optimization in the pico eNB 42-2. Otherwise, the determination unit 404 determines that the pico eNB 42-2 is not performing wireless-parameter optimization in the pico eNB 42-2.

Figure 6:
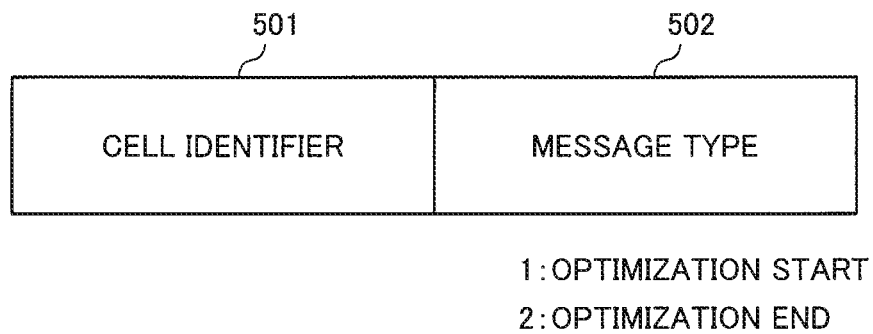
FIG. 6 is a diagram illustrating a first example of a format of a message transmitted from the pico eNB illustrated in FIG. 3.

FIG. 6 is a diagram illustrating a first example of a format of a message transmitted from the pico eNB 42-2 illustrated in FIG. 3.

As illustrated in FIG. 6, the message transmitted from the pico eNB 42-2 illustrated in FIG. 3 consists of a cell identifier 501 and a message type 502. The cell identifier 501 is identification information previously set for each cell to identify to which cell a message relates. The cell identifier 501 may use, for example, ECGI (E-UTRAN Cell Global ID). The message type 502 is information indicating whether the message is a start message indicating that optimization processing of wireless parameters is started or a termination message indicating that the optimization processing of wireless parameters is terminated. In the example illustrated in FIG. 6, "1" is set for the message type 502 when the message indicates a start message, and "2" is set for the message type 502 when the message indicates a termination message.

When the determination unit 404 determines that the pico eNB 42-2 is not performing wireless-parameter optimization in the pico eNB 42-2, the communication unit 403 transmits a start message to the pico eNB 42-2 via the communication medium 7 to report that optimization processing is started (step S13). The start message transmitted here is a message in which a cell identifier of the pico cell 62-1 of the pico eNB 42-1 is set for the cell identifier 501 and "1" is set for the message type 502, in the format illustrated in FIG. 6.

Subsequently, the wireless-parameter control unit 402 collects measurement data necessary for performing optimization processing of wireless parameters (step S14). This collection method may be a common method as disclosed in PTL 1. The wireless-parameter control unit 402 performs optimization processing of wireless parameters in the pico eNB 42-1 using the collected measurement data (step S15). Specifically, the wireless-parameter control unit 402 calculates optimum wireless parameters using the collected measurement data and applies the calculated optimum wireless parameters to the wireless communication unit 401.

Thereafter, when the optimization processing of wireless parameters is terminated, the communication unit 403 transmits a termination message to the pico eNB 42-2 via the communication medium 7 to report that the optimization processing is terminated (step S16). The termination message transmitted here is a message in which the cell identifier of the pico cell 62-1 of the pico eNB 42-1 is set for the cell identifier 501 and "2" is set for the message type 502, in the format illustrated in FIG. 6.

On the other hand, in step S12, when the determination unit 404 determines that the pico eNB 42-2 is performing wireless-parameter optimization in the pico eNB 42-2, the wireless-parameter control unit 402 cancels performing optimization processing of wireless parameters in the pico eNB 42-1 (step S17). In other words, in this case, the wireless-parameter control unit 402 does not perform optimization processing of wireless parameters in the pico eNB 42-1. In a case where a plurality of other wireless base stations exist, when any one of the plurality of wireless base stations is performing wireless-parameter optimization, the wireless-parameter control unit 402 cancels performing optimization processing of wireless parameters in the pico eNB 42-1.

Figure 7:
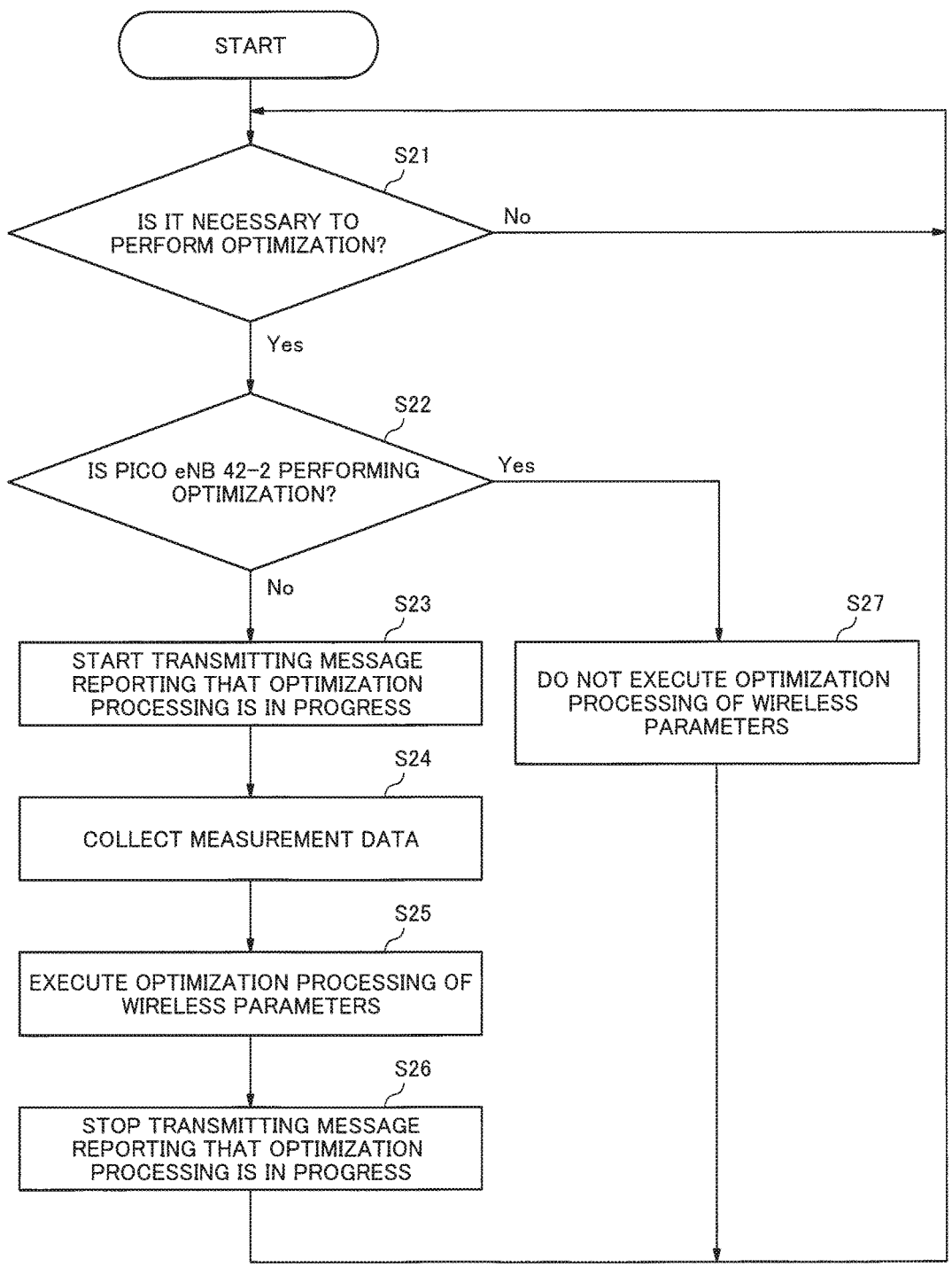
FIG. 7 is a flowchart for illustrating a second example of the wireless-parameter optimization method in the embodiment illustrated in FIG. 3.

FIG. 7 is a flowchart for illustrating a second example of the wireless-parameter optimization method in the embodiment illustrated in FIG. 3.

First, the wireless-parameter control unit 402 aggregates measurement data measured by the wireless communication unit 401 and determines, on the basis of the aggregated result, whether it is necessary to perform wireless-parameter optimization in the pico eNB 42-1 (step S21). The aggregation of measurement data may be performed using a method of performing aggregation at every certain cycle. When the wireless-parameter control unit 402 determines that it is necessary to perform wireless-parameter optimization, the determination unit 404 determines whether the pico eNB 42-2 serving as another wireless base station is performing wireless-parameter optimization in the pico eNB 42-2 (step S22). At that time, when an optimization-in-progress message is being transmitted from the pico eNB 42-2 at a predetermined cycle, the determination unit 404 determines that the pico eNB 42-2 is performing wireless-parameter optimization in the pico eNB 42-2. Otherwise, the determination unit 404 determines that the pico eNB 42-2 is not performing wireless-parameter optimization in the pico eNB 42-2. Further, the above-described cycle is set previously.

Figure 8:
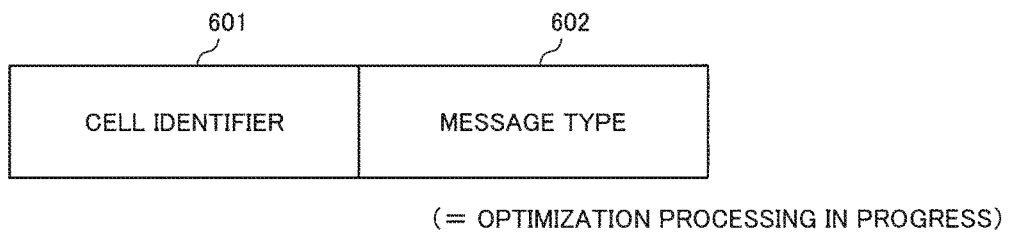
FIG. 8 is a diagram illustrating a second example of a format of a message transmitted from the pico eNB illustrated in FIG. 3.

FIG. 8 is a diagram illustrating a second example of a format of a message transmitted from the pico eNB 42-2 illustrated in FIG. 3.

As illustrated in FIG. 8, the message transmitted from the pico eNB 42-2 illustrated in FIG. 3 consists of a cell identifier 601 and a message type 602. The cell identifier 601 is identification information previously set for each cell to identify to which cell a message relates. The cell identifier 601 may use, for example, ECGI. The message type 602 is information indicating whether the message is an optimization-in-progress message indicating that optimization processing of wireless parameters is in progress. When the message indicates an optimization-in-progress message, a predetermined value is set for the message type 602.

When the determination unit 404 determines that the pico eNB 42-2 is not performing wireless-parameter optimization in the pico eNB 42-2, the communication unit 403 starts periodically transmitting an optimization-in-progress message to the pico eNB 42-2 via the communication medium 7 to report that optimization processing is in progress (step S23). The optimization-in-progress message transmitted here is a message in which the cell identifier of the pico cell 62-1 of the pico eNB 42-1 is set for the cell identifier 601 and a predetermined value is set for the message type 602, in the format illustrated in FIG. 8.

Figure 9:
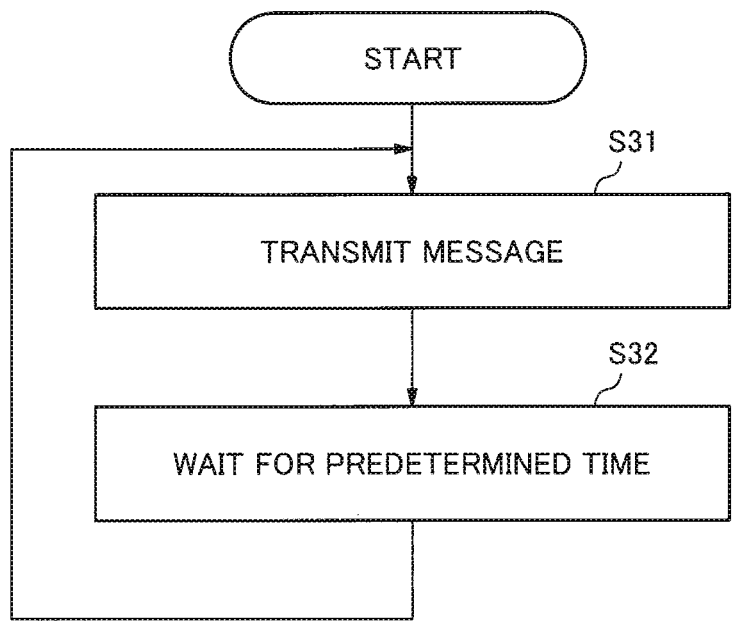
FIG. 9 is a flowchart for illustrating one example of processing for transmitting an optimization-in-progress message by a communication unit illustrated in FIG. 4.

FIG. 9 is a flowchart for illustrating one example of processing for transmitting an optimization-in-progress message by the communication unit 403 illustrated in FIG. 4.

The communication unit 403 transmits an optimization-in-progress message (step S31). Thereafter, the communication unit 403 waits for a previously set time (step S32). In other words, the communication unit 403 does not transmit the optimization-in-progress message during the previously set time. This time is a time equal to or shorter than a cycle for determining reception of an optimization-in-progress message by the determination unit 404 in step S22. The communication unit 403 transmits the optimization-in-progress message again after waiting for the previously set time.

When the communication unit 403 transmits the optimization-in-progress message, the wireless-parameter control unit 402 collects measurement data necessary for performing optimization processing of wireless parameters (step S24). This collection method may be the same as the method used in step S14. The wireless-parameter control unit 402 performs optimization processing of wireless parameters in the pico eNB 42-1 using the collected measurement data (step S25). Specifically, the wireless-parameter control unit 402 calculates optimum wireless parameters using the collected measurement data and applies the calculated optimum wireless parameters to the wireless communication unit 401.

Thereafter, when the optimization processing of wireless parameters is terminated, the communication unit 403 stops transmitting the optimization-in-progress message (step S26).

On the other hand, when the determination unit 404 determines that the pico eNB 42-2 is performing wireless-parameter optimization in the pico eNB 42-2 in step S22, the wireless-parameter control unit 402 cancels performing optimization processing of wireless parameters in the pico eNB 42-1 (step S27). In other words, in this case, the wireless-parameter control unit 402 does not perform optimization processing of wireless parameters in the pico eNB 42-1. In a case where a plurality of other wireless base stations exist, when any one of the plurality of wireless base stations is performing wireless-parameter optimization, the wireless-parameter control unit 402 cancels performing optimization processing of wireless parameters in the pico eNB 42-1.

In this manner, a message indicating the execution of optimization processing of wireless parameters is repeatedly transmitted at a predetermined cycle, and therefore even when a loss of the message occurs on the communication medium 7, it is possible to eliminate a mismatch between states generated on the transmission side and the reception side.

Figure 10:
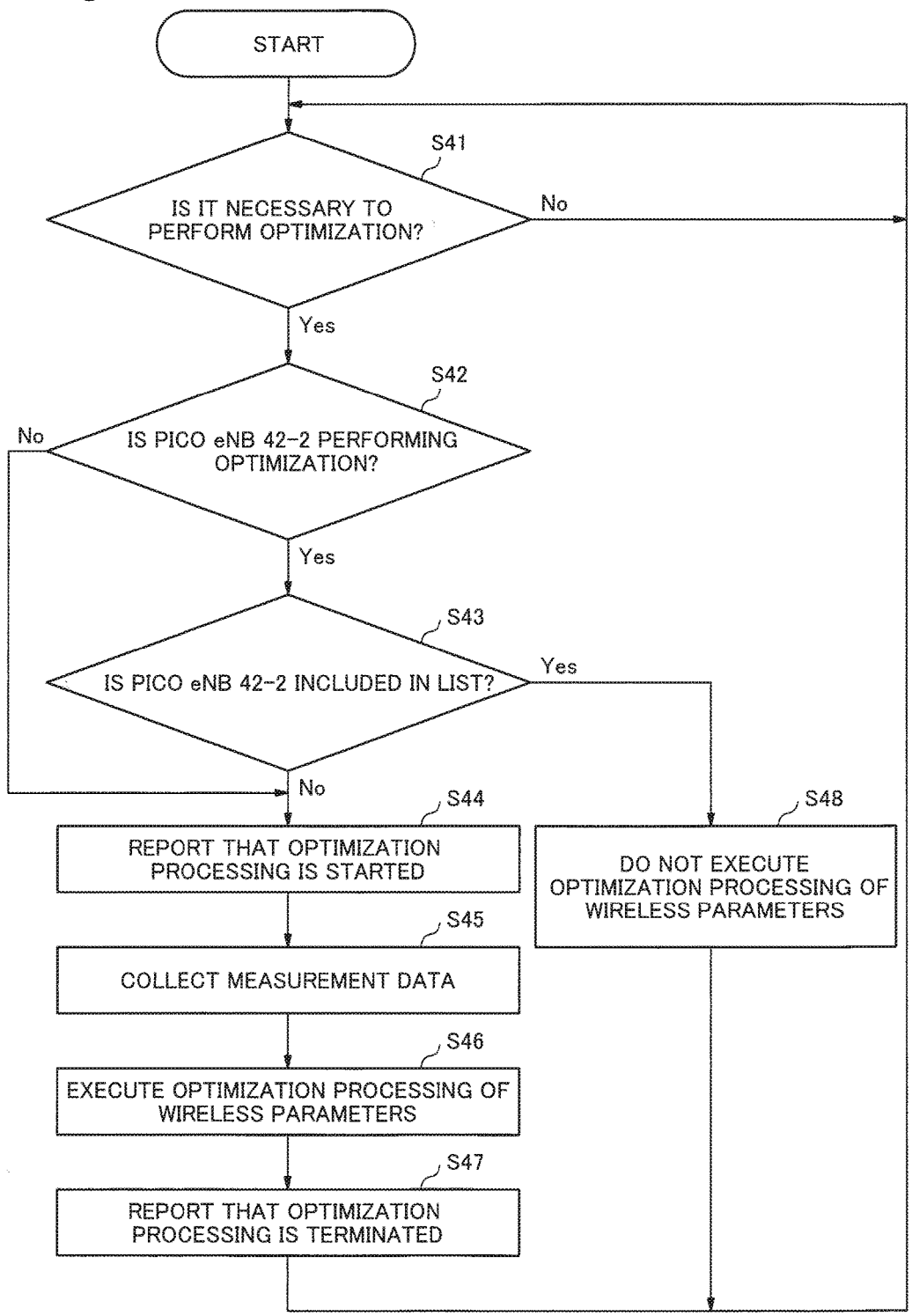
FIG. 10 is a flowchart for illustrating a third example of the wireless-parameter optimization method in the embodiment illustrated in FIG. 3.

FIG. 10 is a flowchart for illustrating a third example of the wireless-parameter optimization method in the embodiment illustrated in FIG. 3.

First, the wireless-parameter control unit 402 aggregates measurement data measured by the wireless communication unit 401 and determines, on the basis of the aggregated result, whether it is necessary to perform wireless-parameter optimization in the pico eNB 42-1 (step S41). The aggregation of measurement data may be performed using a method of performing aggregation at every certain cycle. When the wireless-parameter control unit 402 determines that it is necessary to perform wireless-parameter optimization, the determination unit 404 determines whether the pico eNB 42-2 serving as another wireless base station is performing wireless-parameter optimization in the pico eNB 42-2 (step S42). At that time, during a period from transmission of a start message from the pico eNB 42-2 to transmission of a termination message therefrom, the determination unit 404 determines that the pico eNB 42-2 is performing wireless-parameter optimization in the pico eNB 42-2. Otherwise, the determination unit 404 determines that the pico eNB 42-2 is not performing wireless-parameter optimization in the pico eNB 42-2. A format of the start message and the termination message may be the one illustrated in FIG. 6.

When the determination unit 404 determines that the pico eNB 42-2 is performing wireless-parameter optimization in the pico eNB 42-2, the wireless-parameter control unit 402 determines whether the pico eNB 42-2 is a wireless base station included in a previously set list (step S43). This list is previously stored on the pico eNB 42-1. Further, the list may be set by an input from the outside of the pico eNB 42-1 or stored by being distributed from the core network 1, and an acquisition method therefor is not specifically defined. Further, the list stores an identifier of a wireless base station having a coverage adjacent to the pico cell 62-1 that is a coverage of the pico eNB 42-1. As examples of the list, there are a cell list for cell reselection and a cell list for handover.

When the wireless-parameter control unit 402 determines that the pico eNB 42-2 is not a wireless base station included in the previously set list, the communication unit 403 transmits a start message to the pico eNB 42-2 via the communication medium 7 to report that optimization processing is started (step S44). The start message transmitted here is a message in which the cell identifier of the pico cell 62-1 of the pico eNB 42-1 is set for the cell identifier 501 and "1" is set for the message type 502, in the format illustrated in FIG. 6.

On the other hand, when the determination unit 404 determines that the pico eNB 42-2 is not performing wireless-parameter optimization in the pico eNB 42-2 in step S42, the pico eNB 42-1 does not execute the processing of step S43 but executes the processing of step S44.

Subsequently, the wireless-parameter control unit 402 collects measurement data necessary for performing optimization processing of wireless parameters (step S45). This collection method may be the same as the method described in step S14. The wireless-parameter control unit 402 performs optimization processing of wireless parameters in the pico eNB 42-1 using the collected measurement data (step S46). Specifically, the wireless-parameter control unit 402 calculates optimum wireless parameters using the collected measurement data and applies the calculated optimum wireless parameters to the wireless communication unit 401.

Thereafter, when the optimization processing of wireless parameters is terminated, the communication unit 403 transmits a termination message to the pico eNB 42-2 via the communication medium 7 to report that the optimization processing is terminated (step S47). The termination message transmitted here is a message in which the cell identifier of the pico cell 62-1 of the pico eNB 42-1 is set for the cell identifier 501 and "2" is set for the message type 502, in the format illustrated in FIG. 6.

On the other hand, when determining that the pico eNB 42-2 is a wireless base station included in the previously set list in step S43, the wireless-parameter control unit 402 cancels performing optimization processing of wireless parameters in the pico eNB 42-1 (step S48). In other words, in this case, the wireless-parameter control unit 402 does not perform optimization processing of wireless parameters in the pico eNB 42-1. In a case where a plurality of other wireless base stations exist, when any one of the plurality of wireless base stations is a wireless base station included in the list, the wireless-parameter control unit 402 cancels performing optimization processing of wireless parameters in the pico eNB 42-1.

In the first and second examples of the wireless-parameter optimization method described above, all wireless base stations in which an X2 link is established on the communication medium 7 are regarded as neighboring wireless base stations. Therefore, even when the wireless base station is disposed in a sufficiently far position to the extent that a wireless-parameter change of the wireless base station does not actually influence a wireless-parameter change of the own wireless base station, it is possible that wireless-parameter optimization of the own wireless base station is not performed. On the other hand, in the third example of the wireless-parameter optimization method, it is assumed that a wireless base station provided with an identifier stored in a neighbor cell list is a neighboring wireless base station. Therefore, when the wireless base station is disposed in a sufficiently far position to the extent that a wireless-parameter change of the wireless base station does not influence a wireless-parameter change of the own wireless base station, wireless-parameter optimization of the own wireless base station can be performed.

Figure 11:
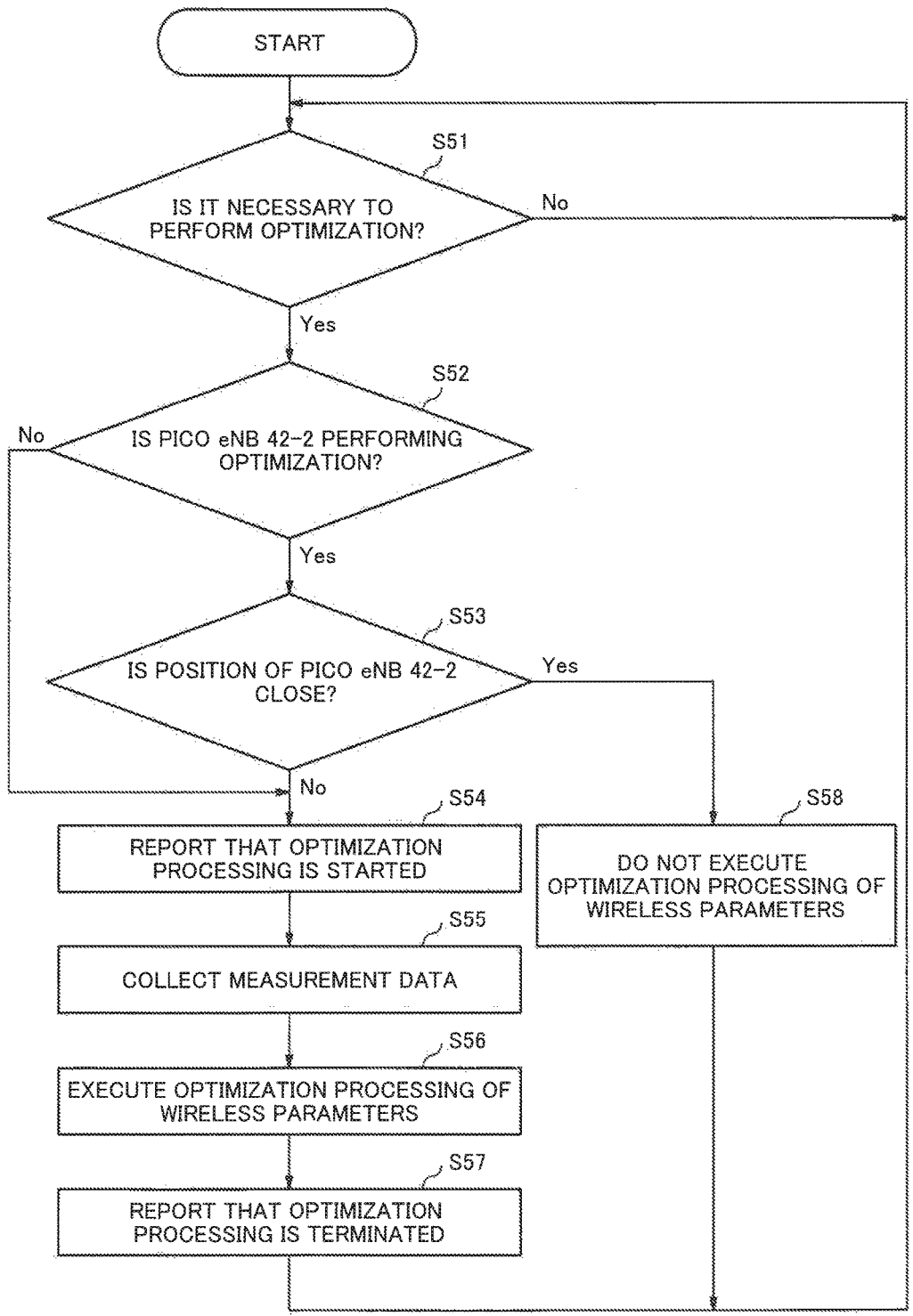
FIG. 11 is a flowchart for illustrating a fourth example of the wireless-parameter optimization method in the embodiment illustrated in FIG. 3.

FIG. 11 is a flowchart for illustrating a fourth example of the wireless-parameter optimization method in the embodiment illustrated in FIG. 3.

First, the wireless-parameter control unit 402 aggregates measurement data measured by the wireless communication unit 401 and determines, on the basis of the aggregated result, whether it is necessary to perform wireless-parameter optimization in the pico eNB 42-1 (step S51). The aggregation of measurement data may be performed using a method of performing aggregation at every certain cycle. When the wireless-parameter control unit 402 determines that it is necessary to perform wireless-parameter optimization, the determination unit 404 determines whether the pico eNB 42-2 serving as another wireless base station is performing wireless-parameter optimization in the pico eNB 42-2 (step S52). At that time, during a period from transmission of a start message from the pico eNB 42-2 to transmission of a termination message therefrom, the determination unit 404 determines that the pico eNB 42-2 is performing wireless-parameter optimization in the pico eNB 42-2. Otherwise, the determination unit 404 determines that the pico eNB 42-2 is not performing wireless-parameter optimization in the pico eNB 42-2.

Figure 12:
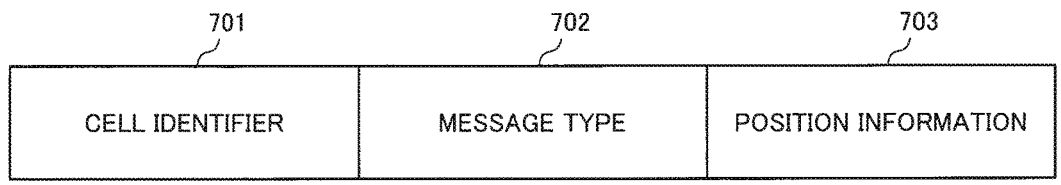
FIG. 12 is a diagram illustrating a third example of a format of a message transmitted from the pico eNB illustrated in FIG. 3.

FIG. 12 is a diagram illustrating a third example of a format of a message transmitted from the pico eNB 42-2 illustrated in FIG. 3.

As illustrated in FIG. 12, the message transmitted from the pico eNB 42-2 illustrated in FIG. 3 consists of a cell identifier 701, a message type 702, and position information 703. The cell identifier 701 is identification information previously set for each cell to identify to which cell a message relates. The cell identifier 701 may use, for example, ECGI. The message type 702 is information indicating whether the message is a start message indicating that optimization processing of wireless parameters is started or a termination message indicating that the optimization processing of wireless parameters is terminated. In the example illustrated in FIG. 12, when the message indicates a start message, "1" is set for the message type 702, and when the message indicates a termination message, "2" is set for the message type 702. The position information 703 is information indicating a position where there is the pico eNB 42-2. The position information 703 includes, for example, longitude/latitude information, RF (Radio Frequency) fingerprint information, and the like.

When the determination unit 404 determines that the pico eNB 42-2 is performing wireless-parameter optimization in the pico eNB 42-2, the determination unit 404 determines whether a position of the pico eNB 42-2 is geographically close to a position of the pico eNB 42-1 (step S53). Specifically, the determination unit 404 determines whether the pico eNB 42-2 is a neighboring wireless base station neighboring to the pico eNB 42-1, in accordance with a position (own station position) of the pico eNB 42-1 and a position (another station position) of the pico eNB 42-2 indicated by the position information transmitted from the pico eNB 42-2. In other words, the determination unit 404 calculates a distance from an own station to another station using the own station position and the another station position. The determination unit then determines, when the determined distance is equal to or smaller than a predetermined threshold, that the pico eNB 42-2 is a neighboring wireless base station neighboring to the pico eNB 42-1 (the position of the pico eNB 42-2 is close to the position of the pico eNB 42-1). Otherwise, the determination unit 404 determines that the pico eNB 42-2 is not a neighboring wireless base station neighboring to the pico eNB 42-1 (the position of the pico eNB 42-2 is not close to the position of the pico eNB 42-1). As illustrated in FIG. 12, the position information is included in the message transmitted from the pico eNB 42-2.

When the determination unit 404 determines that the position of the pico eNB 42-2 is not close to the position of the pico eNB 42-1, the communication unit 403 transmits a start message to the pico eNB 42-2 via the communication medium 7 to report that optimization processing is started (step S54). The start message transmitted here is a message in which the cell identifier of the pico cell 62-1 of the pico eNB 42-1 is set for the cell identifier 701, "1" is set for the message type 702, and position information indicating the position of the pico eNB 42-1 is set for the position information 703, in a format illustrated in FIG. 12.

On the other hand, when the determination unit 404 determines that the pico eNB 42-2 is not performing wireless-parameter optimization in the pico eNB 42-2 in step S52, the pico eNB 42-1 does not execute the processing of step S53 but executes the processing of step S54.

Subsequently, the wireless-parameter control unit 402 collects measurement data necessary for performing optimization processing of wireless parameters (step S55). This collection method may be the same as the method described in step S14. The wireless-parameter control unit 402 performs optimization processing of wireless parameters in the pico eNB 42-1 using the collected measurement data (step S56). Specifically, the wireless-parameter control unit 402 calculates optimum wireless parameters using the collected measurement data and applies the calculated optimum wireless parameters to the wireless communication unit 401.

Thereafter, when the optimization processing of wireless parameters is terminated, the communication unit 403 transmits a termination message to the pico eNB 42-2 via the communication medium 7 to report that the optimization processing is terminated (step S57). The termination message transmitted here is a message in which the cell identifier of the pico cell 62-1 of the pico eNB 42-1 is set for the cell identifier 701 and "2" is set for the message type 702, in the format illustrated in FIG. 12. Further, position information indicating the position of the pico eNB 42-1 may be set for the position information 703 in the format illustrated in FIG. 12.

On the other hand, when it is determined that the position of the pico eNB 42-2 is close to the position of the pico eNB 42-1 in step S53, the wireless-parameter control unit 402 cancels performing optimization processing in the pico eNB 42-1 (step S58). In other words, in this case, the wireless-parameter control unit 402 does not perform optimization processing of wireless parameters in the pico eNB 42-1. In a case where a plurality of other wireless base stations exist, when a position of any one of the plurality of wireless base stations is a wireless base station close to a position of the own wireless base station, the wireless-parameter control unit 402 cancels performing optimization processing in the pico eNB 42-1

In this manner, it is determined whether an own wireless base station is close to another wireless base station using respective pieces of position information. Therefore, it is possible to determine whether another wireless base station is a neighboring base station more accurately than the third processing example.

Figure 13:
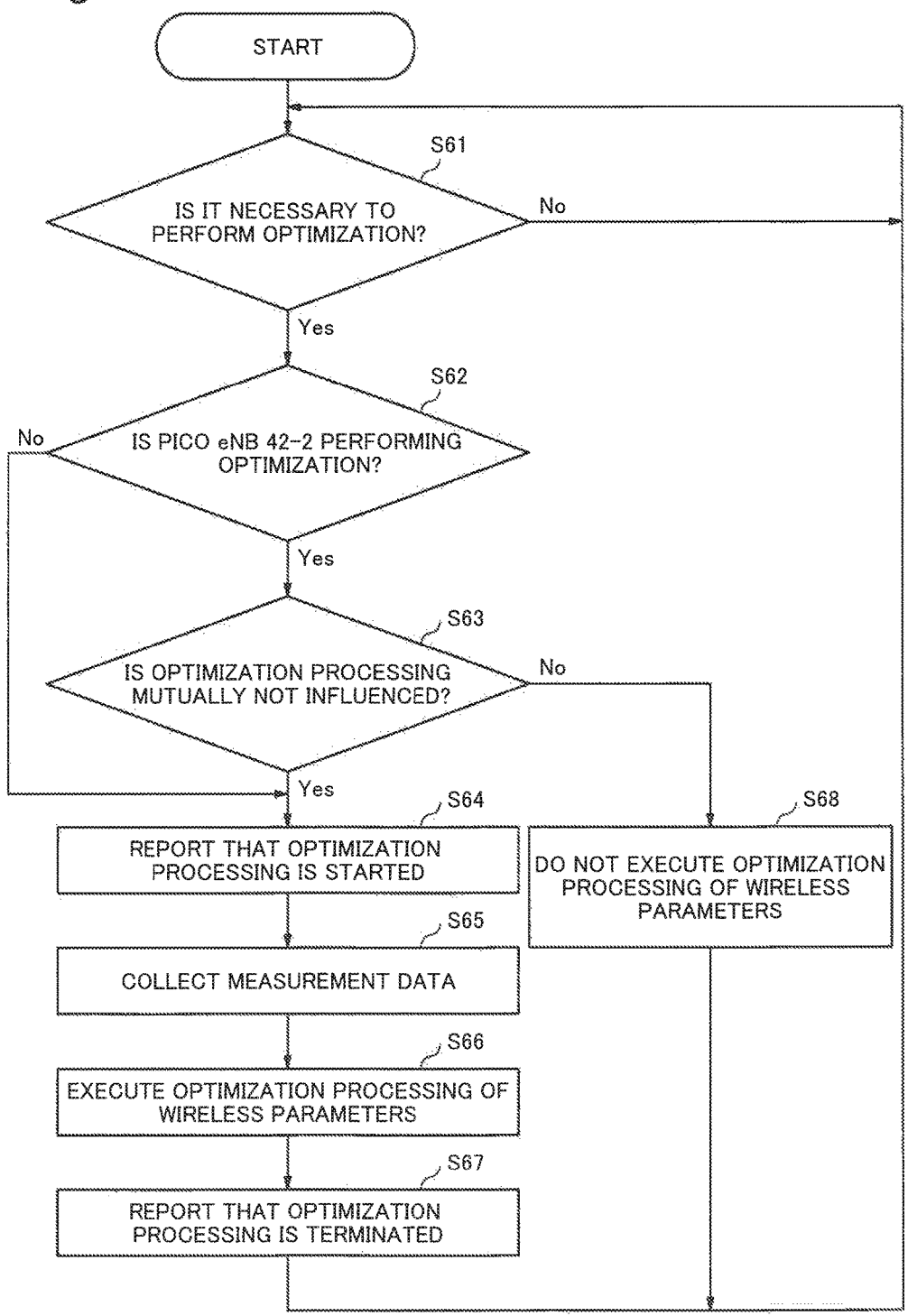
FIG. 13 is a flowchart for illustrating a fifth example of the wireless-parameter optimization method in the embodiment illustrated in FIG. 3.

FIG. 13 is a flowchart for illustrating a fifth example of the wireless-parameter optimization method in the embodiment illustrated in FIG. 3.

First, the wireless-parameter control unit 402 aggregates measurement data measured by the wireless communication unit 401 and determines, on the basis of the aggregated result, whether it is necessary to perform wireless-parameter optimization in the pico eNB 42-1 (step S61). The aggregation of measurement data may be performed using a method of performing aggregation at every certain cycle. When the wireless-parameter control unit 402 determines that it is necessary to perform wireless-parameter optimization, the determination unit 404 determines whether the pico eNB 42-2 serving as another wireless base station is performing wireless-parameter optimization in the pico eNB 42-2 (step S62). At that time, during a period from transmission of a start message from the pico eNB 42-2 to transmission of a termination message therefrom, the determination unit 404 determines that the pico eNB 42-2 is performing wireless-parameter optimization in the pico eNB 42-2. Otherwise, the determination unit 404 determines that the pico eNB 42-2 is not performing wireless-parameter optimization in the pico eNB 42-2.

Figure 14:
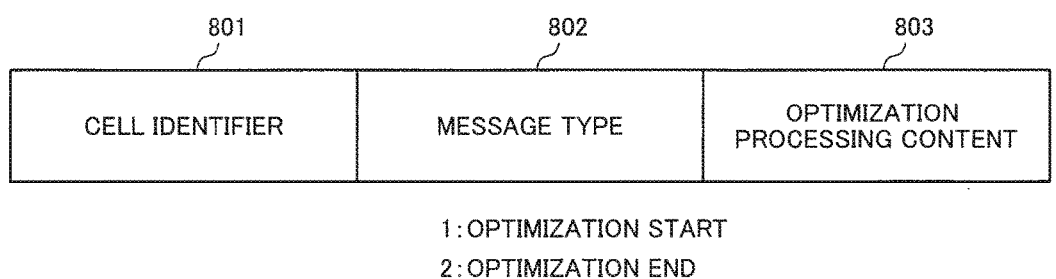
FIG. 14 is a diagram illustrating a fourth example of a format of a message transmitted from the pico eNB illustrated in FIG. 3.

FIG. 14 is a diagram illustrating a fourth example of a format of a message transmitted from the pico eNB 42-2 illustrated in FIG. 3.

As illustrated in FIG. 14, the message transmitted from the pico eNB 42-2 illustrated in FIG. 3 consists of a cell identifier 801, a message type 802, and an optimization processing content 803. The cell identifier 801 is identification information previously set for each cell to identify to which cell a message relates. The cell identifier 801 may use, for example, ECGI. The message type 802 is information indicating whether the message is a start message indicating that optimization processing of wireless parameters is started or a termination message indicating that the optimization processing of wireless parameters is terminated. In the example illustrated in FIG. 14, when the message indicates a start message, "1" is set for the message type 802, and when the message indicates a termination message, "2" is set for the message type 802. A content that is currently being attempted to be optimized or is being optimized by an own station is set in the optimization processing content 803. Specifically, in the optimization processing content 803, wireless parameters that are being attempted to be optimized or are being optimized are set, for example.

Figure 20:
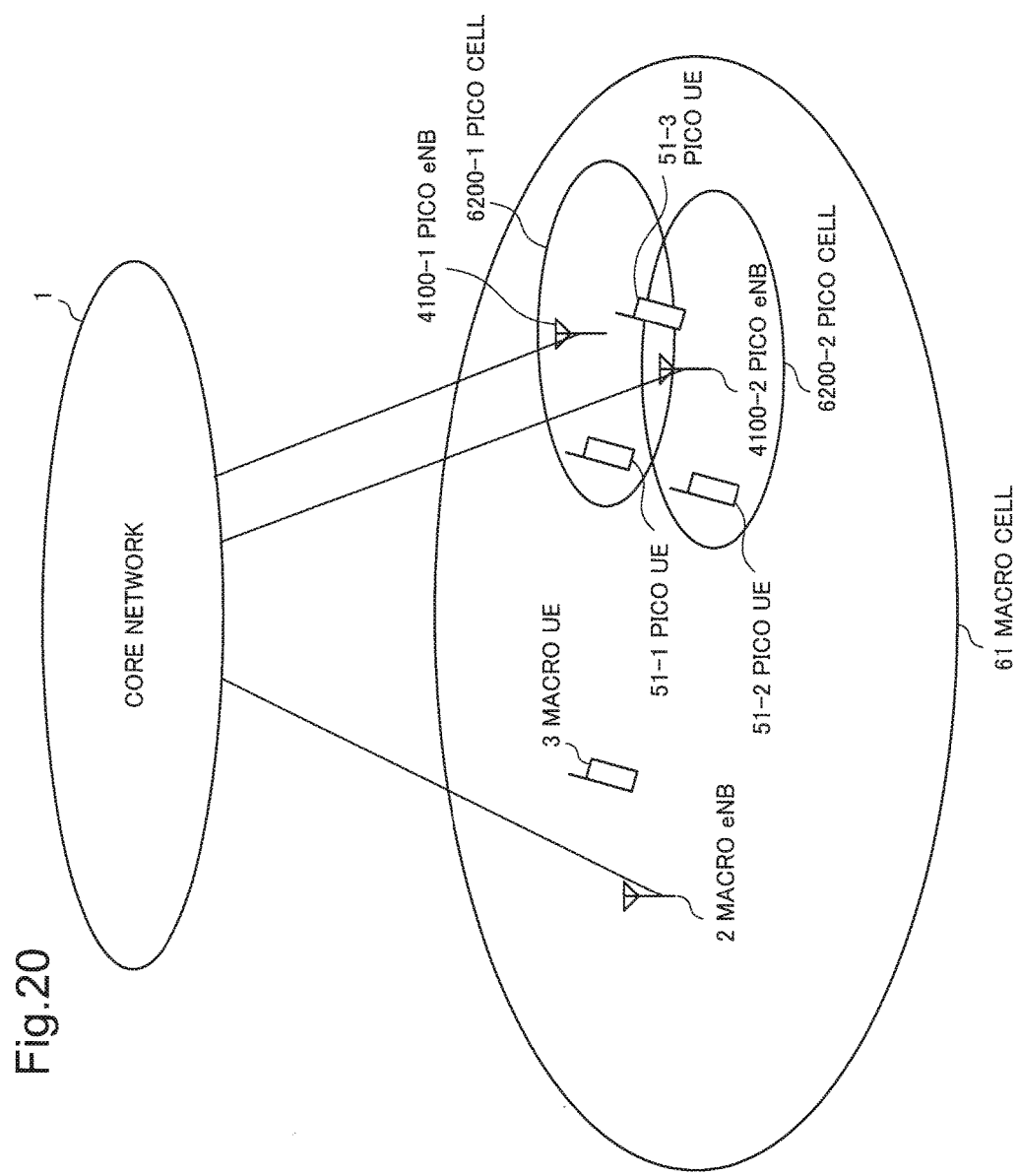
FIG. 20 is a diagram illustrating one form of a common communication system.
Figure 21:
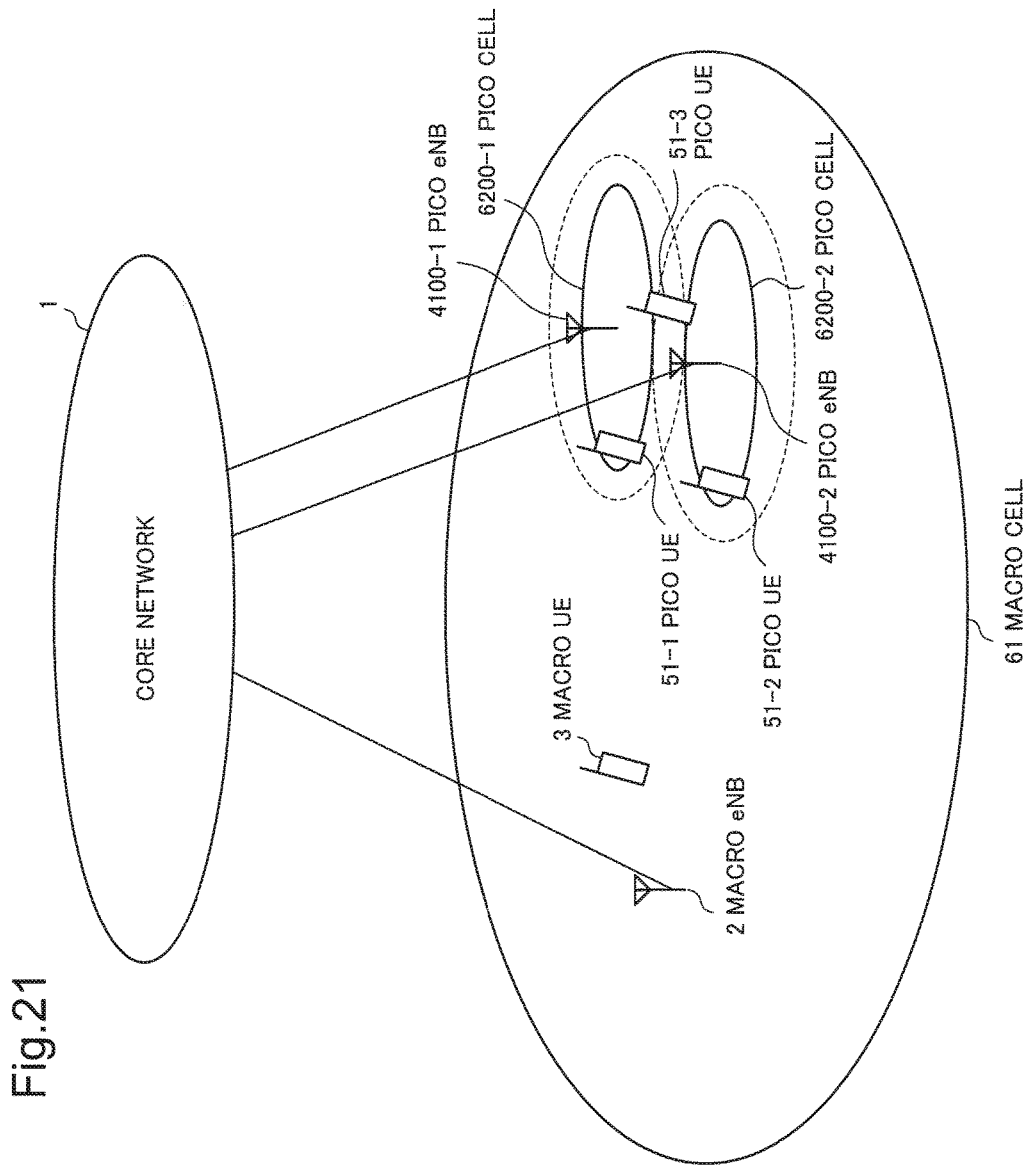
FIG. 21 is a diagram illustrating one example of a state of changes of pico cells after two pico eNBs illustrated in FIG. 20 change wireless parameters at the same time.

When the determination unit 404 determines that the pico eNB 42-2 is performing wireless-parameter optimization in the pico eNB 42-2, the wireless-parameter control unit 402 determines whether the wireless-parameter change influences wireless-parameter optimization in the pico eNB 42-1 (step S63). At that time, the wireless-parameter control unit 402 refers to an optimization processing content included in the message transmitted from the pico eNB 42-2 and determines whether the wireless-parameter change influences wireless-parameter optimization of the pico eNB 42-1. Further, in conjunction therewith, the wireless-parameter control unit 402 determines whether the wireless-parameter optimization that is about to be performed in the pico eNB 42-1 influences the wireless-parameter optimization being performed in the pico eNB 42-2. An example of causing an influence includes a case in which a communication terminal, as described using FIG. 20, is not included in any of cells neighboring to each other.

When the wireless-parameter control unit 402 determines that wireless-parameter optimization in one wireless base station and wireless-parameter optimization in the other wireless base station do not influence each other, the communication unit 403 reports a start of optimization processing to the pico eNB 42-2 via the communication medium 7 (step S64). This report is made by transmitting a start message. The start message transmitted here is a message in which the cell identifier of the pico cell 62-1 of the pico eNB 42-1 is set for the cell identifier 801, "1" is set for the message type 802, and further, a content subjected to wireless-parameter optimization is set for the optimization processing content 803, in the format illustrated in FIG. 14.

On the other hand, when the determination unit 404 determines that the pico eNB 42-2 is not preforming wireless-parameter optimization in the pico eNB 42-2 in step S62, the pico eNB 42-1 does not execute the processing of step S63 but executes the processing of step S64.

Subsequently, the wireless-parameter control unit 402 collects measurement data necessary for performing optimization processing of wireless parameters (step S65). This collection method may be the same as the method described in step S14. The wireless-parameter control unit 402 performs optimization processing of wireless parameters in the pico eNB 42-1 using the collected measurement data (step S66). Specifically, the wireless-parameter control unit 402 calculates optimum wireless parameters using the collected measurement data and applies the calculated optimum wireless parameters to the wireless communication unit 401.

Thereafter, when the optimization processing of wireless parameters is terminated, the communication unit 403 transmits a termination message to the pico eNB 42-2 via the communication medium 7 to report that the optimization processing is terminated (step S67). The termination message transmitted here is a message in which the cell identifier of the pico cell 62-1 of the pico eNB 42-1 is set for the cell identifier 801 and "2" is set for the message type 802, in the format illustrated in FIG. 14. Further, it may be a message in which a content subjected to wireless-parameter optimization is set for the optimization processing content 803 in the format illustrated in FIG. 14.

On the other hand, when it is determined that wireless-parameter optimization in one wireless base station influences wireless-parameter optimization in the other wireless base station in step S63, the wireless-parameter control unit 402 cancels performing optimization processing of wireless parameters in the pico eNB 42-1 (step S68). In other words, in this case, the wireless-parameter control unit 402 does not perform optimization processing of wireless parameters in the pico eNB 42-1. In a case where a plurality of other wireless base stations exist, when wireless-parameter optimization in any one of the wireless base stations influences wireless-parameter optimization in the pico eNB 42-1, the wireless-parameter control unit 402 cancels performing optimization processing of wireless parameters in the pico eNB 42-1. Further, inversely, when wireless-parameter optimization in the pico eNB 42-1 influences wireless-parameter optimization in any one of the wireless base stations, the wireless-parameter control unit 402 cancels performing optimization processing of wireless parameters in the pico eNB 42-1.

In this manner, even when optimization is being performed in another wireless base station, optimization processing of wireless parameters in an own wireless base station is performed when wireless-parameter optimization does not influence mutual optimization. Thereby, it is possible for optimization to avoid being unnecessarily suppressed.

The processings of the first to fifth examples of the wireless-parameter optimization method described above may be combined.

Figure 15:
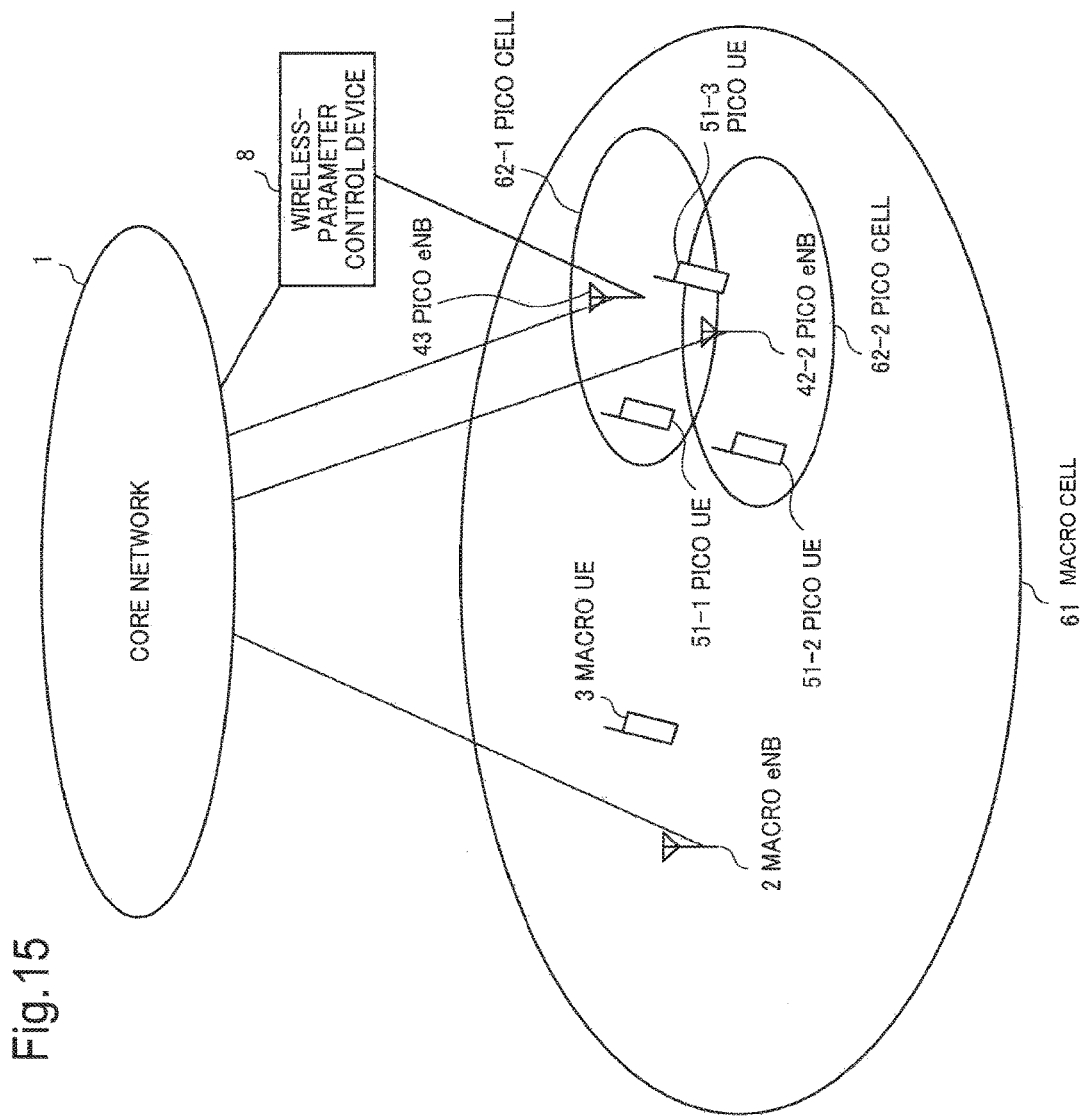
FIG. 15 is a diagram illustrating a modified example of the embodiment illustrated in FIG. 3.

FIG. 15 is a diagram illustrating a modified example of the embodiment illustrated in FIG. 3.

In a form illustrated in FIG. 15, instead of the pico eNB 42-1 illustrated in FIG. 3, a pico eNB 43 is provided. Further, a wireless-parameter control device 8 is connected to the core network 1 and the pico eNB 43.

The pico eNB 43 is a wireless base station in which wireless parameters are controlled by the wireless-parameter control device 8.

The wireless-parameter control device 8 includes a wireless-parameter control means (also referred to as a wireless-parameter control unit) and a determination means (also referred to as a determination unit). The wireless-parameter control means of the wireless-parameter control device 8 receives measurement data from the pico eNB 43 and controls wireless parameters of the pico eNB 43 on the basis of the received measurement data. Specifically, the wireless-parameter control means of the wireless-parameter control device 8 determines whether it is necessary to perform wireless-parameter optimization in the pico eNB 43 on the basis of the received measurement data. The determination means of the wireless-parameter control device 8 determines whether wireless-parameter optimization is being performed in the pico eNB 42-2 that is a wireless base station other than the pico eNB 43 when the wireless-parameter control means determines that it is necessary to perform wireless-parameter optimization in the pico eNB 43. Further, the wireless-parameter control means of the wireless-parameter control device 8 preforms wireless-parameter optimization in the pico eNB 43 when the determination means determines that wireless-parameter optimization in the pico eNB 42-2 that is a wireless base station other than the pico eNB 43 is not being performed. On the other hand, the wireless-parameter control means of the wireless-parameter control device 8 cancels performing wireless-parameter optimization in the pico eNB 43 when the determination means determines that wireless-parameter optimization in the pico eNB 42-2 that is a wireless base station other than the pico eNB 43 is being performed.

Further, the wireless-parameter control means of the wireless-parameter control device 8 reports, when executing wireless-parameter optimization of the pico eNB 43, the execution of the optimization to the pico eNB 42-2 neighboring to the pico eNB 43. This report is transmitted to the pico eNB 42-2, for example, via the core network 1. On the other hand, the pico eNB 42-2 reports, when executing wireless-parameter optimization, the execution of the optimization to the pico eNB 43 via the core network 1 and the wireless-parameter control unit 8. For this report, the above-described start message, termination message, or optimization-in-progress message may be used.

Further, the wireless-parameter control device 8 may perform control using the above-described neighbor cell list or position information of a wireless base station. Further, the wireless-parameter control device 8 may perform optimization processing of wireless parameters on the basis of whether optimization processing of wireless parameters influences mutual optimization processing of wireless parameters as described above.

(Third Exemplary Embodiment)

Figure 16:
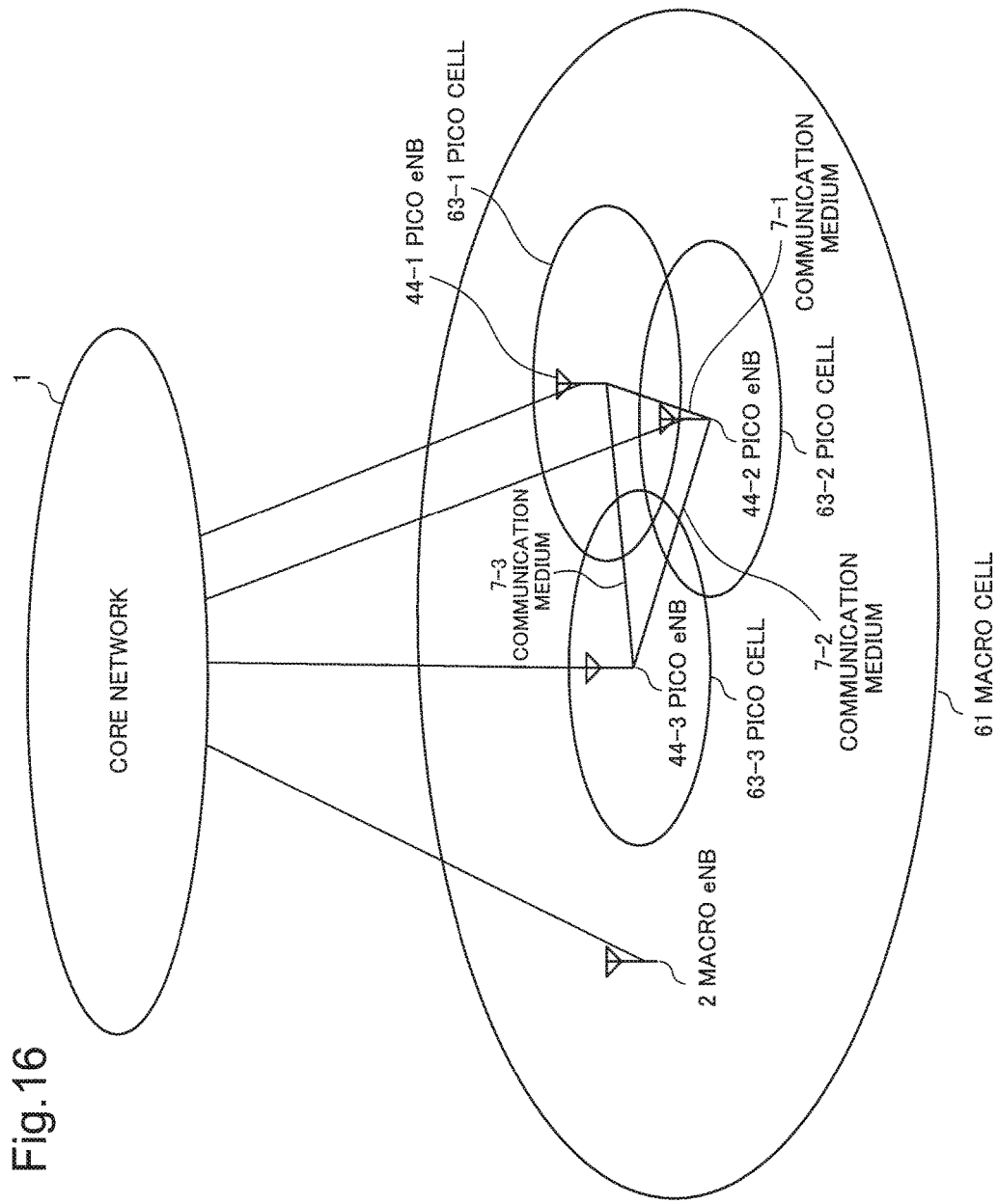
FIG. 16 is a diagram illustrating a third embodiment of the wireless base station of the exemplary embodiment.

FIG. 16 is a diagram illustrating a third embodiment of the wireless base station of the exemplary embodiment.

As illustrated in FIG. 16, the present embodiment is a communication system in which a macro eNB 2 and pico eNBs 44-1 to 44-3 are connected to a core network 1.

The core network 1 is a higher-level network of the macro eNB 2 and the pico eNBs 44-1 to 44-3. The macro eNB 2 is a wireless base station in which a macro cell 61 is formed as a coverage. The pico eNB 44-1 is a wireless base station in which a pico cell 63-1 is formed as a coverage. The pico eNB 44-2 is a wireless base station in which a pico cell 63-2 is formed as a coverage. The pico eNB 44-3 is a wireless base station in which a pico cell 63-3 is formed as a coverage. The pico cells 63-1 to 63-3 are cells neighboring to each other. Further, the pico eNB 44-1 and the pico eNB 44-2 are connected via a communication medium 7-1. Further, the pico eNB 44-2 and the pico eNB 44-3 are connected via a communication medium 7-2. Further, the pico eNB 44-1 and the pico eNB 44-3 are connected via a communication medium 7-3. For example, an X2 link may be established in the communication media 7-1 to 7-3.

Note that an internal configuration of each of the pico eNBs 44-1 to 44-3 may be the same as the internal configuration of the pico eNB 42-1 illustrated in FIG. 4. However, processing descried below is added to processing executed by respective components.

Figure 17:
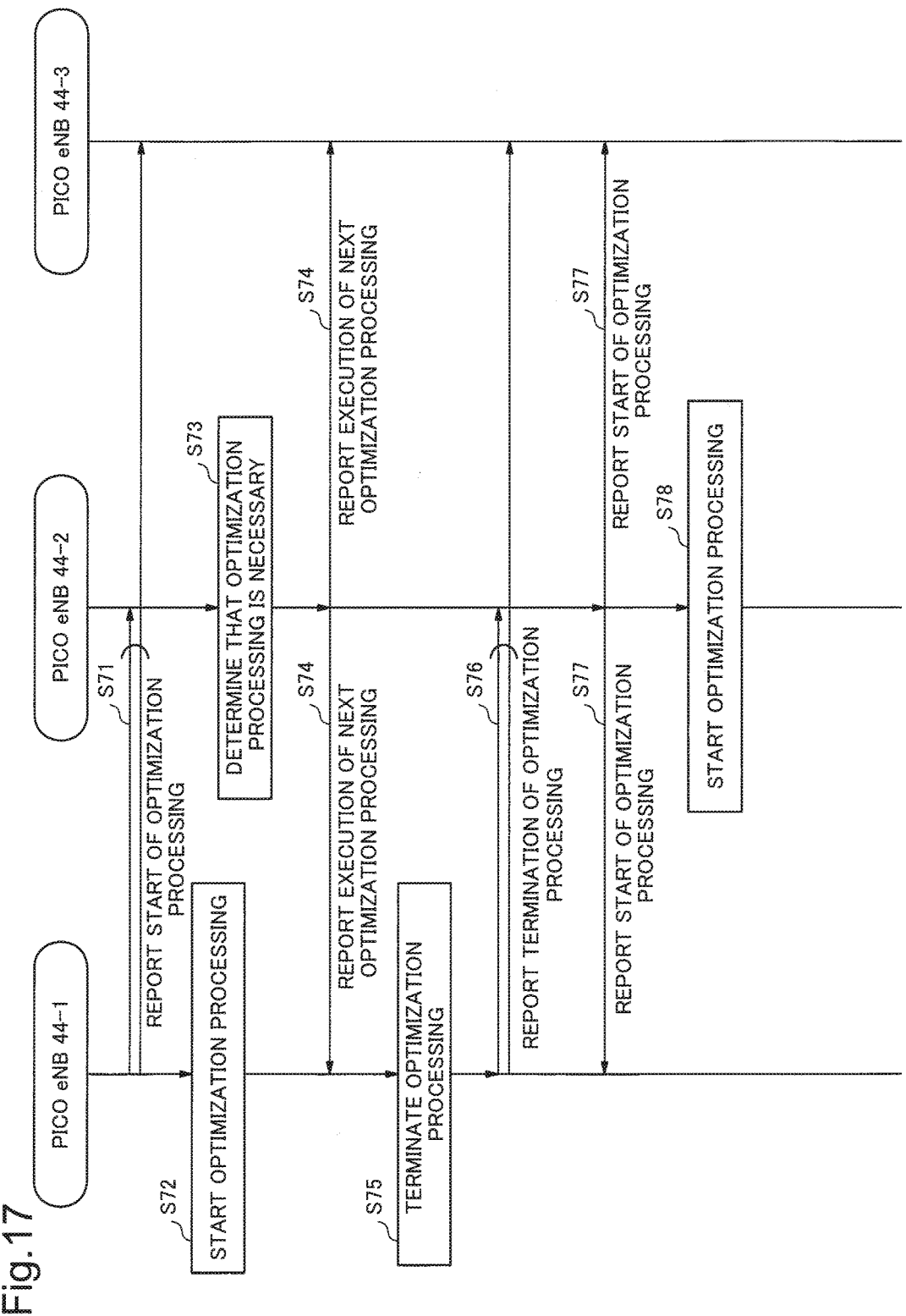
FIG. 17 is a sequence diagram for illustrating a first example of a wireless-parameter optimization method in the embodiment illustrated in FIG. 16.

FIG. 17 is a sequence diagram for illustrating a first example of a wireless-parameter optimization method in the embodiment illustrated in FIG. 16.

First, the pico eNB 44-1 reports a start of optimization processing of wireless parameters to the pico eNB 44-2 and the pico eNB 44-3 (step S71). Subsequently, the pico eNB 44-1 starts the optimization processing of wireless parameters (step S72). When the pico eNB 44-2 determines that it is necessary to perform optimization processing of wireless parameters while the pico eNB 44-1 is performing the optimization processing of wireless parameters (step S73), the pico eNB 44-2 reports next execution of optimization processing of wireless parameters (step S74). The report destinations are the pico eNB 44-1 and the pico eNB 44-3.

When the pico eNB 44-1 terminates the optimization processing of wireless parameters (step S75), the pico eNB 44-1 reports the termination of the optimization processing of wireless parameters to the pico eNB 44-2 and the pico eNB 44-3 (step S76).

The pico eNB 44-2 then reports a start of optimization processing of wireless parameters to the pico eNB 44-1 and the pico eNB 44-3 (step S77). Subsequently, the pico eNB 44-2 starts the optimization processing of wireless parameters (step S78).

Figure 18:
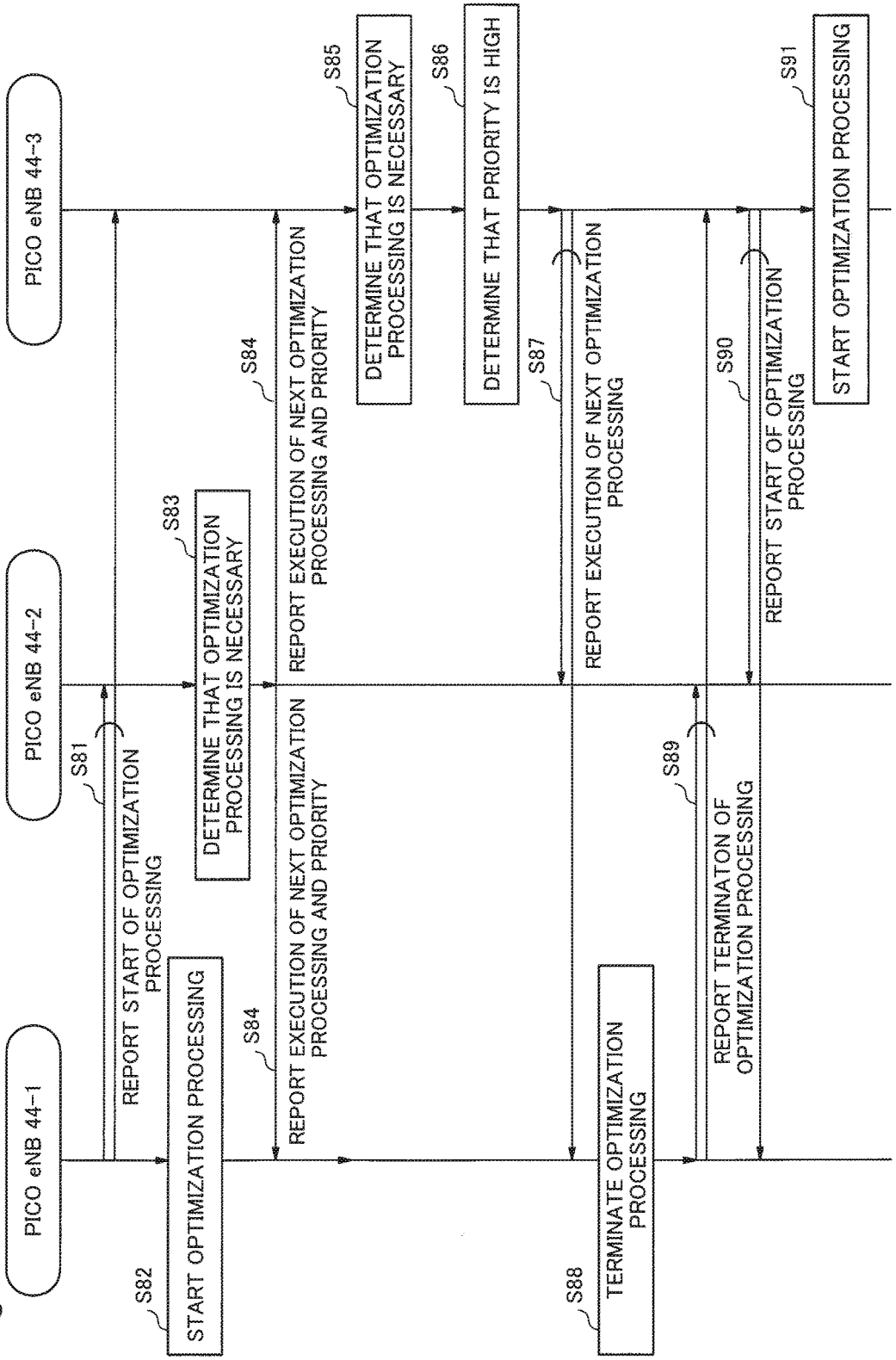
FIG. 18 is a sequence diagram for illustrating a second example of the wireless-parameter optimization method in the embodiment illustrated in FIG. 16.

FIG. 18 is a sequence diagram for illustrating a second example of the wireless-parameter optimization method in the embodiment illustrated in FIG. 16.

First, the pico eNB 44-1 reports a start of optimization processing of wireless parameters to the pico eNB 44-2 and the pico eNB 44-3 (step S81). Subsequently, the pico eNB 44-1 starts optimization processing of wireless parameters (step S82). When the pico eNB 44-2 determines that it is necessary to perform optimization processing of wireless parameters, while the pico eNB 44-1 is performing the optimization processing of wireless parameters (step S83), the pico eNB 44-2 reports next execution of optimization processing of wireless parameters (step S84). The report destinations are the pico eNB 44-1 and the pico eNB 44-3.

Further, the report is made by including a priority. The priority indicates a priority (a degree of necessity) of execution of optimization processing. A number of accommodated communication terminals may be used as an index and the priority may be set at a higher value with an increase in the number of accommodated communication terminals. Alternatively, a downlink transmission power may be used as an index and the priority may be set at a higher value with an increase in the downlink transmission power (an increase in a size of a cell). Further, the priority may be set on the basis of degrees of necessity (mutual orders) of optimization for respective wireless parameters such as: tilt (antenna angle) >downlink transmission power>NCL (neighbor cell list) >CIO (cell individual offset).

Thereafter, when the pico eNB 44-3 determines that it is necessary to execute optimization processing of wireless parameters before terminating the optimization processing in the pico eNB 44-1 (step S85), the pico eNB 44-3 compares a priority of own optimization and the priority reported from the pico eNB 44-2 in step S84. Further, when determining that the priority of own optimization is higher than the priority reported from the pico eNB 44-2 in step S84 (step S86), the pico eNB 44-3 reports next execution of optimization processing of the wireless parameters (step S87). The report destinations are the pico eNB 44-1 and the pico eNB 44-2.

Thereafter, when the pico eNB 44-1 terminates the optimization processing of wireless parameters (step S88), the pico eNB 44-1 reports the termination of the optimization processing of wireless parameters to the pico eNB 44-2 and the pico eNB 44-3 (step S89).

The pico eNB 44-3 then reports a start of optimization processing of wireless parameters to the pico eNB 44-1 and the pico eNB 44-2 (step S90). Subsequently, the pico eNB 44-3 starts the optimization processing of wireless parameters (step S91).

Figure 19:
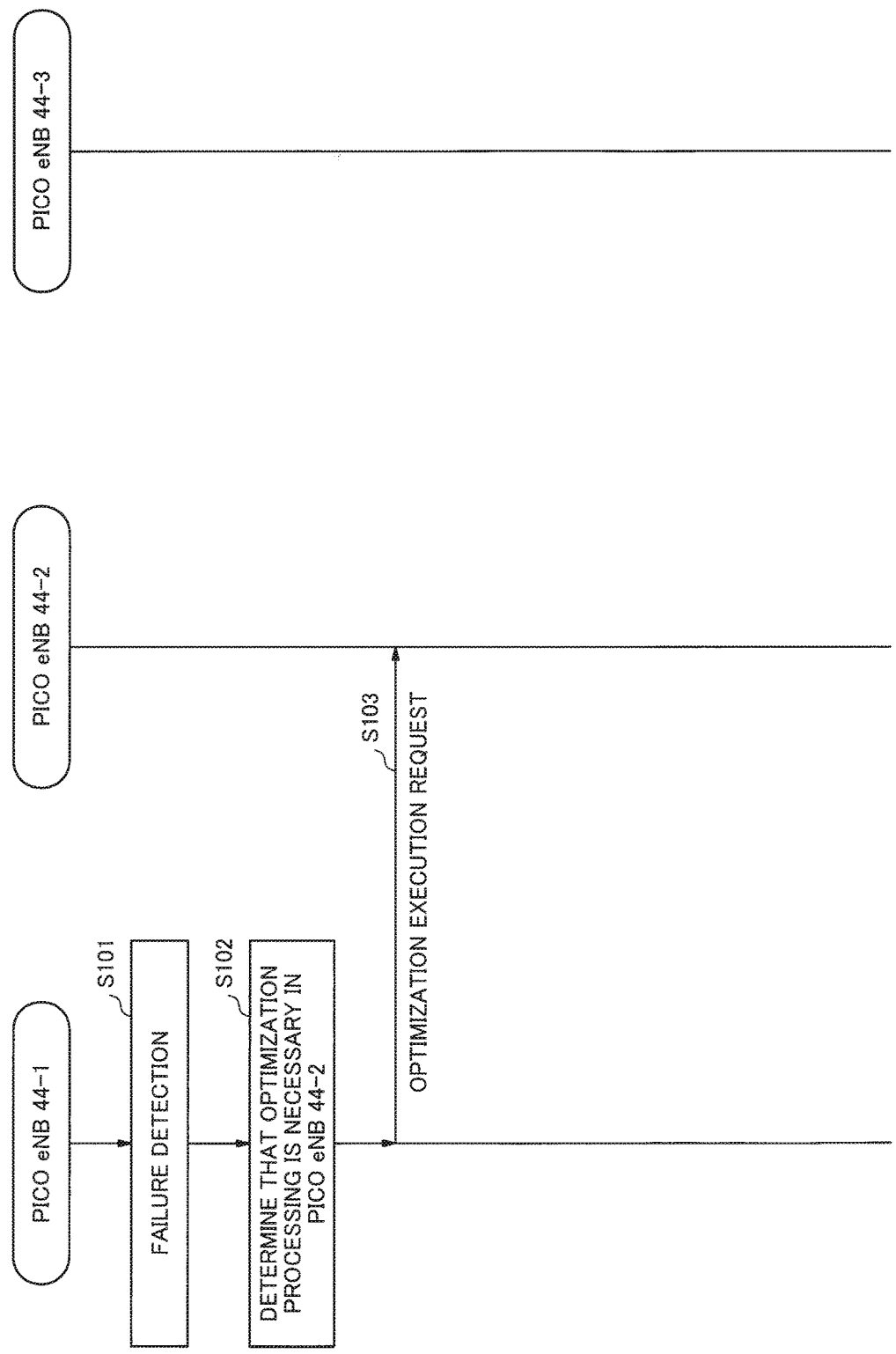
FIG. 19 is a sequence diagram for illustrating a third example of the wireless-parameter optimization method in the embodiment illustrated in FIG. 16.

FIG. 19 is a sequence diagram for illustrating a third example of the wireless-parameter optimization method in the embodiment illustrated in FIG. 16.

First, when the pico eNB 44-1 detects a failure of the pico eNB 44-2 (step S101), the pico eNB 44-1 determines that it is necessary to perform optimization processing of wireless parameters in the pico eNB 44-2 (step S102). For example, when a recovery from a failure of handover processing from the pico eNB 44-1 to the pico eNB 44-2 is not achieved even by applying downlink transmission power or performing optimization processing of CIO, the pico eNB 44-1 determines that it is necessary to perform optimization processing of wireless parameters in the pico eNB 44-2.

Subsequently, the pico eNB 44-1 requests the pico eNB 44-2 to perform optimization processing of wireless parameters (step S103). This request may use a signal in which the pico eNB 44-1 and the pico eNB 44-2 can recognize that it is a request of optimization processing execution with the pico eNB 44-2 as a target.

In the third exemplary embodiment, neighboring wireless base stations mutually make a report or request in accordance with a necessity of optimization processing of wireless parameters, and therefore optimization processing of wireless parameters can be smoothly executed.

In the first to third embodiments, description has been made using pico eNBs in which one wireless base station accommodates one cell, however, the exemplary embodiment is not limited to cases of using the pico eNBs. It goes without saying that the exemplary embodiment is applicable to cases in which one wireless base station includes a plurality of cells such as three cells, six cells, and the like.

In this manner, an own wireless base station reports execution of optimization processing of wireless parameters to another wireless base station. When receiving such a report from another wireless base station, the own wireless base station cancels execution of optimization processing of wireless parameters. Thereby, it is possible to avoid a fault of wireless parameters caused by one wireless base station performing optimization processing while the other wireless base station is performing optimization processing.

The processing performed by respective components included in each of the above-described pico eNBs 42-1, 42-2, and 44-1 to 44-3 may be implemented using logic circuits produced respectively in accordance with purposes. Further, a computer program (hereinafter, referred to as a program) in which processing contents are described as steps is stored on a recording medium (or storage medium) readable in each of the pico eNBs 42-1, 42-2, and 44-1 to 44-3. In addition, it is possible to cause each of the pico eNBs 42-1, 42-2, and 44-1 to 44-3 to read and execute the program recorded on the recording medium. The recording medium readable in each of the pico eNBs 42-1, 42-2, and 44-1 to 44-3 may be a movable recording medium such as a floppy (a trademark) disk, a magnetooptical disc, a DVD (digital versatile disk), a CD (compact disc). Further, the recording medium indicates, in addition thereto, a memory such as a ROM (read only memory) and a RAM (random access memory), an HDD (hard disk drive), and the like incorporated in each of the pico eNBs 42-1, 42-2, and 44-1 to 44-3. The program recorded on the recording medium is read by a CPU (central processing unit) (not illustrated) included in each of the pico eNBs 42-1, 42-2, and 44-1 to 44-3, and the same processing as described above is executed by CPU control. Here, the CPU operates as a computer that executes a program read from a recording medium recorded with the program.

While the present invention has been described with reference to the exemplary embodiments, the present invention is not limited to the above-described exemplary embodiments. Various modifications can be made to the constitution and details of the present invention, which can be understood by those skilled in the art without departing from the scope of the present invention.

A part or all of the exemplary embodiments can be described as the following supplementary notes but the present invention is not limited to the following.
(Supplementary Note 1)
A wireless base station including:
a wireless-parameter control unit that determines whether it is necessary to perform wireless parameter optimization in an own wireless base station; and
a determination unit that determines whether another wireless base station is performing wireless-parameter optimization in the another wireless base station when the wireless-parameter control unit determines that it is necessary to perform the wireless-parameter optimization,
the wireless-parameter control unit performing wireless-parameter optimization in the own wireless base station when the determination unit determines that the another wireless base station is not performing wireless-parameter optimization in the another wireless base station, and cancelling to perform wireless-parameter optimization in the own wireless base station when the determination unit determines that the another wireless base station is performing wireless-parameter optimization in the another wireless base station.

(Supplementary Note 2)

The wireless base station according to Supplementary Note 1 including a communication unit that transmits, when wireless parameter optimization in the own wireless base station is started, a start message indicating that the optimization is started, and transmits, when the optimization is terminated, a termination message indicating the termination of the optimization, wherein, the determination unit determines that the another wireless base station is performing wireless-parameter optimization in the another wireless base station during a period from transmission of the start message, from the another wireless base station, indicating that wireless-parameter optimization in the another wireless base station is started, to transmission of the termination message, from the another wireless base station, indicating that the optimization is terminated.

(Supplementary Note 3)

The wireless base station according to Supplementary Note 1 including a communication unit that transmits, when wireless-parameter optimization in the own wireless base station is being performed, an optimization-in-progress message at a predetermined cycle indicating that the optimization is being performed, wherein the determination unit determines that the another wireless base station is performing wireless-parameter optimization in the another wireless base station when the optimization-in-progress message is being transmitted from the another wireless base station at a predetermined cycle, the optimization-in-progress message indicating that wireless-parameter optimization in the another wireless base station is being performed.

(Supplementary Note 4)

The wireless base station according to any one of Supplementary Notes 1 to 3, wherein even when the determination unit determines that the another wireless base station is performing wireless-parameter optimization in the another wireless base station, the wireless-parameter control unit performs wireless-parameter optimization in the own wireless base station when the another wireless base station is not included in a previously set list.

(Supplementary Note 5)

The wireless base station according to Supplementary Note 1 including a communication unit that transmits position information indicating a position of the own wireless base station, wherein the determination unit determines whether the another wireless base station is a neighboring wireless base station in accordance with a position of the own wireless base station and a position indicated by position information transmitted from the another wireless base station, and even when the determination unit determines that the another wireless base station is performing wireless-parameter optimization in the another wireless base station, the wireless-parameter control unit performs wireless-parameter optimization in the own wireless base station when the another wireless base station is not the neighboring wireless base station.

(Supplementary Note 6)

The wireless base station according to Supplementary Note 1, wherein even when the determination unit determines that the another wireless base station is performing wireless-parameter optimization in the another wireless base station, the wireless-parameter control unit performs wireless-parameter optimization in the own wireless base station when it is determined that a wireless-parameter change does not influence parameter optimization in the own wireless base station.

(Supplementary Note 7)

The wireless base station according to Supplementary Note 6 including a communication unit that transmits a content of the wireless-parameter change, wherein the wireless-parameter control unit determines whether the wireless-parameter change influences wireless-parameter optimization in the own wireless base station based on a content of the wireless-parameter change transmitted from the another wireless base station.

(Supplementary Note 8)

A communication system including a plurality of wireless base stations, the system including:

a wireless-parameter control means configured to determine whether it is necessary to perform wireless-parameter optimization in the wireless base stations; and a determination means configured to determine, when the wireless-parameter control means determines that it is necessary to perform the wireless-parameter optimization, whether wireless-parameter optimization is being performed in a wireless base station other than a wireless base station determined to be necessary to perform the wireless-parameter optimization among the plurality of wireless base stations, the wireless-parameter control means performing wireless-parameter optimization in the wireless base station determined to be necessary to perform the wireless-parameter optimization when the determination means determines that wireless-parameter optimization is not being performed in the wireless base station other than the wireless base station determined to be necessary to perform the wireless-parameter optimization among the plurality of wireless base stations, and cancelling to perform wireless-parameter optimization in the wireless base station determined to be necessary to perform the wireless-parameter optimization when the determination means determines that wireless-parameter optimization is being performed in the wireless base station other than the wireless base station determined to be necessary to perform the wireless-parameter optimization among the plurality of wireless base stations.

(Supplementary Note 9)

The communication system according to Supplementary Note 8, wherein the wireless base station includes the wireless-parameter control means and the determination means.

(Supplementary Note 10)

A wireless-parameter optimization method executing:

processing for determining whether it is necessary to perform wireless-parameter optimization in a wireless base station;

processing for determining, when it is determined that it is necessary to perform the wireless-parameter optimization, whether wireless-parameter optimization is being performed in a wireless base station other than a wireless base station determined to be necessary to perform the wireless-parameter optimization among a plurality of wireless base stations configuring a communication system;

processing for performing wireless-parameter optimization in the wireless base station determined to be necessary to perform the wireless-parameter optimization, when it is determined that wireless-parameter optimization is not being performed in the wireless base station other than the wireless base station determined to be necessary to perform the wireless-parameter optimization among the plurality of wireless base stations; and processing for cancelling to perform wireless-parameter optimization in the wireless base station determined to be necessary to perform the wireless-parameter optimization, when it is determined that wireless-parameter optimization is being performed in the wireless base station other than the wireless base station determined to be necessary to perform the wireless-parameter optimization among the plurality of wireless base stations.

(Supplementary Note 11)

A program for causing a computer to execute:

the step of determining whether it is necessary to perform wireless-parameter optimization in a wireless base station;

the step of determining, when it is determined that it is necessary to perform the wireless-parameter optimization, whether wireless-parameter optimization is being performed in a wireless base station other than a wireless base station determined to be necessary to perform the wireless-parameter optimization among a plurality of wireless base stations configuring a communication system;

the step of performing wireless-parameter optimization in the wireless base station determined to be necessary to perform the wireless-parameter optimization, when it is determined that wireless-parameter optimization is not being performed in the wireless base station other than the wireless base station determined to be necessary to perform the wireless-parameter optimization among the plurality of wireless base stations; and the step of cancelling to perform wireless-parameter optimization in the wireless base station determined to be necessary to perform the wireless-parameter optimization, when it is determined that wireless-parameter optimization is being performed in the wireless base station other than the wireless base station determined to be necessary to perform the wireless-parameter optimization among the plurality of wireless base stations.

Further, this application is based upon and claims the benefit of priority from Japanese Patent Application No. 2014-098365, filed on May 12, 2014, the disclosure of which is incorporated herein in its entirety by reference.

REFERENCE SIGNS LIST

1 Core network
2 Macro eNB
3 Macro UE
7, 7-1 to 7-3 Communication media
8 Wireless-parameter control device
41, 42-1, 42-2, 43, 44-1 to 44-3 Pico eNBs
51-1 to 51-3 Pico UEs
61 Macro cell
62-1, 62-2, 63-1 to 63-3 Pico cells
401 Wireless communication unit
402 Wireless-parameter control unit
403 Communication unit
404 Determination unit
501, 601, 701, 801 Cell identifiers
502, 602, 702, 802 Message types
703 Position information
803 Optimization processing content

What is claimed is:

1. A wireless base station comprising:
a wireless parameter control unit configured to determine whether it is necessary to perform wireless parameter optimization in the wireless base station;
a determination unit configured to determine whether a second wireless base station performs wireless parameter optimization in the second wireless base station when the wireless parameter control unit determines that it is necessary to perform the wireless parameter optimization; and
a communication unit configured to transmit an optimization start message and an optimization termination message respectively indicating start and end of wireless parameter optimization performed in the wireless base station,
wherein the determination unit determines that wireless parameter optimization is performed in the second wireless base station during a period between transmission of the optimization start message and transmission of the optimization termination message when the optimization start message and the optimization termination message are transmitted from the second wireless base station,
wherein the wireless parameter control unit performs wireless parameter optimization in the wireless base station when the determination unit determines that the second wireless base station does not perform wireless parameter optimization in the second wireless base station, and
wherein the wireless parameter control unit cancels to perform wireless parameter optimization in the wireless base station when the determination unit determines that the second wireless base station performs wireless parameter optimization in the second wireless base station.

2. The wireless base station according to claim 1, wherein the communication unit is further configured to transmit, at a predetermined cycle, an optimization in progress message indicating that the optimization is being performed when wireless parameter optimization in the wireless base station is being performed, wherein the determination unit determines that the second wireless base station is performing wireless parameter optimization in the second wireless base station when the optimization in progress message is transmitted from the second wireless base station at a predetermined cycle.

3. The wireless base station according to claim 1,
wherein even when the determination unit determines that the second wireless base station is performing wireless parameter optimization in the second wireless base station, the wireless parameter control unit performs wireless parameter optimization in the wireless base station when the second wireless base station is not included in a predetermined list.

4. The wireless base station according to claim 1,
wherein the communication unit is further configured to transmit position information indicating a position of the wireless base station,
wherein the determination unit determines whether the second wireless base station is a neighboring wireless base station in accordance with a position of the wireless base station and a position indicated by position information transmitted from the another wireless base station, and
wherein, even when the determination unit determines that the second wireless base station is performing wireless parameter optimization in the second wireless base station, the wireless parameter control unit performs wireless parameter optimization in the wireless base station when the second wireless base station is not the neighboring wireless base station.

5. The wireless base station according to claim 1,
wherein, even when the determination unit determines that the second wireless base station is performing wireless parameter optimization in the second wireless base station, the wireless parameter control unit performs wireless parameter optimization in the wireless base station when it is determined that a wireless parameter change does not influence parameter optimization in the wireless base station.

6. The wireless base station according to claim 5,
wherein the communication unit is further configured to transmit a content of the wireless parameter change, wherein the wireless parameter control unit determines whether the wireless parameter change influences wireless parameter optimization in the wireless base station based on a content of the wireless parameter change transmitted from the second wireless base station.

7. A communication system comprising:
a plurality of wireless base stations, each wireless base station forming a cell as a coverage for a communication terminal, and being connected to a second wireless base station each other via a communication medium,
wherein the wireless base station includes,
a wireless parameter control unit configured to determine whether it is necessary to perform wireless parameter optimization in the wireless base station; a determination unit configured to determine, when the wireless parameter control unit determines that it is necessary to perform the wireless parameter optimization, whether wireless parameter optimization is being performed in the second wireless base station; and a communication unit configured to transmit an optimization start message and an optimization termination message respectively indicating start and end of wireless parameter optimization performed in the wireless base station,
wherein the determination unit determines that wireless parameter optimization is performed in the second wireless base station during a period between transmission of the optimization start message and transmission of the optimization termination message when the optimization start message and the optimization termination message are transmitted from the second wireless base station,
wherein the wireless parameter control unit performs wireless parameter optimization in the wireless base station when the determination unit determines that wireless parameter optimization is not being performed in the second wireless base station, and wherein the wireless parameter control unit cancels to perform wireless parameter optimization in the wireless base station when the determination unit determines that wireless parameter optimization is being performed in the second wireless base station.

8. A wireless parameter optimization method of a wireless base station comprising:
determining whether it is necessary to perform wireless parameter optimization in the wireless base station;
determining, when it is determined that it is necessary to perform the wireless-parameter optimization, whether wireless parameter optimization is being performed in a second wireless base station;
transmitting an optimization start message and an optimization termination message respectively indicating start and end of wireless parameter optimization performed in the wireless base station;
determining that wireless parameter optimization is performed in the second wireless base station during a period between transmission of the optimization start message and transmission of the optimization termination message when the optimization start message and the optimization termination message are transmitted from the second wireless base station,
performing wireless parameter optimization in the wireless base station when it is determined that wireless parameter optimization is not being performed in the second wireless base station; and
cancelling to perform wireless parameter optimization in the wireless base station when it is determined that wireless parameter optimization is being performed in the second wireless base station.

9. A non-transitory computer-readable storage medium storing a computer program, which when executed by a computer, causes the computer to execute a process of a wireless base station:
determining whether it is necessary to perform wireless parameter optimization in the wireless base station;
determining, when it is determined that it is necessary to perform the wireless parameter optimization, whether wireless parameter optimization is being performed in a second wireless base station;
transmitting an optimization start message and an optimization termination message respectively indicating start and end of wireless parameter optimization performed in the wireless base station;
determining that wireless parameter optimization is performed in the second wireless base station during a period between transmission of the optimization start message and transmission of the optimization termination message when the optimization start message and the optimization termination message are transmitted from the second wireless base station;
performing wireless parameter optimization in the wireless base station when it is determined that wireless parameter optimization is not being performed in the second wireless base station; and
cancelling to perform wireless parameter optimization in the wireless base station when it is determined that wireless parameter optimization is being performed in the second wireless base station.

10. A wireless parameter optimization method of a communication system including a plurality of wireless base stations, each wireless base station forming a cell as a coverage for a communication terminal and being connected to a second wireless base station each other via a communication medium, the method comprising:
transmitting optimization start message and optimization termination message respectively indicating start and end of wireless parameter optimization from any wireless base station performing wireless parameter optimization;
determining, by a first wireless base station, whether it is necessary to perform wireless parameter optimization in the first wireless base station;
determining, by the first wireless base station, when it is determined that it is necessary to perform the wireless parameter optimization, whether wireless parameter optimization is being performed in any wireless base station other than the first wireless base station;
determining, by the first wireless base station, that wireless parameter optimization is performed in a second wireless base station during a period between transmission of the optimization start message and transmission of the optimization termination message when the optimization start message and the optimization termination message are transmitted from the second wireless base station, performing wireless parameter optimization in the first wireless base station when it is determined that wireless parameter optimization is not being performed in the second wireless base station; and cancelling to perform wireless parameter optimization in the first wireless base station when it is determined that wireless parameter optimization is being performed in the second wireless base station.

11. The wireless parameter optimization method according to claim 10, the method further comprising:

transmitting, by a third wireless base station, a report requesting next execution of wireless parameter optimization by the third wireless base station when necessity to perform the wireless parameter optimization is determined in the third wireless base station while the first wireless base station is performing the wireless parameter optimization; and transmitting, by the third wireless base station, the optimization start message when the optimization termination message is transmitted from the third wireless base station, and starting to perform the wireless parameter optimization in the third wireless base station.

12. The wireless parameter optimization method according to claim 10, the method further comprising:

transmitting, by a third wireless base station, a report requesting next execution of wireless parameter optimization by the third wireless base station and including a priority indicating a degree of necessity of execution of the wireless parameter optimization when necessity to perform the wireless parameter optimization is determined in the third wireless base station while the first wireless base station is performing the wireless parameter optimization;

transmitting, by a fourth wireless base station, the report requesting next execution of wireless parameter optimization by the fourth wireless base station while the first wireless base station, is performing the wireless parameter optimization, when necessity to perform the wireless parameter optimization is determined in the fourth wireless base station after transmitting the report by the third wireless base station and when determining that the priority of wireless parameter optimization to be performed by the fourth wireless base station is higher than the priority reported by the second third wireless base station; and transmitting, by the fourth wireless base station, the optimization start message when the optimization termination message is transmitted from the first wireless base station, and starting to perform the wireless parameter optimization in the fourth wireless base station.

* * * * *